(12) United States Patent
Marchand et al.

(10) Patent No.: US 11,035,415 B2
(45) Date of Patent: Jun. 15, 2021

(54) UNIVERSAL DRIVESHAFT ASSEMBLY

(71) Applicant: National Oilwell Varco, L.P., Houston, TX (US)

(72) Inventors: Nicholas Ryan Marchand, Edmonton (CA); Masoud Kalantari, Edmonton (CA)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 210 days.

(21) Appl. No.: 16/292,225

(22) Filed: Mar. 4, 2019

(65) Prior Publication Data

US 2019/0195286 A1 Jun. 27, 2019

Related U.S. Application Data

(63) Continuation of application No. 15/325,475, filed as application No. PCT/US2015/040513 on Jul. 15, 2015, now Pat. No. 10,408,274.

(Continued)

(51) Int. Cl.
*F16D 3/20* (2006.01)
*E21B 4/02* (2006.01)
(Continued)

(52) U.S. Cl.
CPC .................. *F16D 3/20* (2013.01); *E21B 4/02* (2013.01); *E21B 17/04* (2013.01); *E21B 17/046* (2013.01)

(58) Field of Classification Search
CPC .......... F16D 3/20; E21B 17/04; E21B 17/046; E21B 4/02

(Continued)

(56) References Cited

U.S. PATENT DOCUMENTS 3,257,826 A   6/1966 Peterson
5,224,898 A   7/1993 Johnson et al.
(Continued)

FOREIGN PATENT DOCUMENTS

CN    2162556 Y    4/1994
CN    102066793 A  5/2011
JP    2001113972 A 4/2001

OTHER PUBLICATIONS

Universal Joint and Driveshaft Design Manual, AE-7, Society of Automotive Engineers Inc., Warrendale, PA, pp. 131-140, TJ1079.S62. (Year: 1979).*

(Continued)

*Primary Examiner* — Greg Binda
(74) *Attorney, Agent, or Firm* — Conley Rose, P.C.

(57) ABSTRACT

A driveshaft assembly includes a driveshaft including a longitudinal shaft axis, a first end, a second end, and a radially outer surface. The first end includes a plurality of recesses extending radially inward from the radially outer surface. The recesses each include a convex engagement surface. The driveshaft assembly also includes a first end housing including a longitudinal housing axis and an axially extending receptacle. The receptacle includes a plurality of planar receptacle surfaces. In addition, the driveshaft assembly includes a plurality of torque transfer keys configured to transfer torque between the driveshaft and first end housing. Each of the torque transfer keys includes a planar key surface and a concave key surface. The convex engagement surface of each recess engages the concave key surface of one of the torque transfer keys. The planar key surface of each torque transfer key engages one of the planar receptacle surfaces.

15 Claims, 17 Drawing Sheets

Related U.S. Application Data

(60) Provisional application No. 62/025,322, filed on Jul. 16, 2014, provisional application No. 62/025,326, filed on Jul. 16, 2014.

(51) Int. Cl.
   *E21B 17/046* (2006.01)
   *E21B 17/04* (2006.01)

(58) Field of Classification Search
   USPC .......................................................... 464/152
   See application file for complete search history.

(56) References Cited

U.S. PATENT DOCUMENTS

| | | | | |
|---|---|---|---|---|
| 5,803,814 | A * | 9/1998 | Welschof | ................ F16C 29/04 |
| 8,033,917 | B2 | 10/2011 | Prill et al. | |
| 9,915,106 | B2 * | 3/2018 | Underwood | ............ E21B 17/05 |
| 2006/0240896 | A1 | 10/2006 | Ohashi et al. | |
| 2009/0298597 | A1 | 12/2009 | Wall et al. | |
| 2011/0005839 | A1 | 1/2011 | Marchand et al. | |

OTHER PUBLICATIONS

Chinese Office Action dated Apr. 26, 2019, for Chinese Application No. 201580038917.3 (6 p.).
English Translation of Chinese Office Action dated Apr. 26, 2019, for Chinese Application No. 201580038917.3 (7 p.).
PCT/US2015/040513 International Search Report and Written Opinion dated Nov. 18, 2015 (14 p.).
Chinese Office Action dated Aug. 30, 2018, for Chinese Application No. 201580038917.3 (4 p.).
English Translation of Chinese Office Action dated Aug. 30, 2018, for Chinese Application No. 201580038917.3 (4 p.).
Chinese Search Report dated Aug. 17, 2018, for Chinese Application No. 201580038917.3 (3 p.).
Chinese Search Report dated Aug. 17, 2018, for Chinese Application No. 201580038917.3 (2 p.).

* cited by examiner

UNIVERSAL DRIVESHAFT ASSEMBLY

CROSS-REFERENCE TO RELATED APPLICATIONS

This application is a continuation of U.S. application Ser. No. 15/325,475 filed Jan. 11, 2017 (now U.S. Pat. No. 10,408,274, which is a 35 U.S.C. § 371 national stage entry of PCT/US2015/040513, filed Jul. 15, 2015, and entitled "Universal Driveshaft Assembly," which claims the benefit of U.S. provisional patent application Ser. No. 62/025,322 filed Jul. 16, 2014, and entitled "Universal Driveshaft Assembly," and U.S. provisional patent application Ser. No. 62/025,326 filed Jul. 16, 2014, and entitled "Universal Driveshaft Assembly," the contents of each of the foregoing are hereby incorporated herein by reference in their entirety for all purposes.

STATEMENT REGARDING FEDERALLY SPONSORED RESEARCH OR DEVELOPMENT

Not applicable.

BACKGROUND

The disclosure relates generally to universal joints for transmitting torque between rotating shafts having intersecting but non-coincident rotational axes. More particularly, the disclosure relates to universal joints for driveshafts employed in downhole motors used in the oil and gas drilling operations.

In drilling a borehole into an earthen formation, such as for the recovery of hydrocarbons or minerals from a subsurface formation, it is conventional practice to connect a drill bit onto the lower end of a drillstring formed from a plurality of pipe joints connected together end-to-end, and then rotate the drill string so that the drill bit progresses downward into the earth to create a borehole along a predetermined trajectory. In addition to pipe joints, the drillstring typically includes heavier tubular members known as drill collars positioned between the pipe joints and the drill bit. The drill collars increase the vertical load applied to the drill bit to enhance its operational effectiveness. Other accessories commonly incorporated into drill strings include stabilizers to assist in maintaining the desired direction of the drilled borehole, and reamers to ensure that the drilled borehole is maintained at a desired gauge (i.e., diameter). In vertical drilling operations, the drillstring and drill bit are typically rotated from the surface with a top dive or rotary table.

During the drilling operations, drilling fluid or mud is pumped under pressure down the drill string, out the face of the drill bit into the borehole, and then up the annulus between the drill string and the borehole sidewall to the surface. The drilling fluid, which may be water-based or oil-based, is typically viscous to enhance its ability to carry borehole cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the borehole wall (to stabilize and seal the borehole wall).

It has become increasingly common and desirable in the oil and gas industry to drill horizontal and other non-vertical boreholes (i.e., "directional drilling"), to facilitate more efficient access to and production from larger regions of subsurface hydrocarbon-bearing formations than would be possible using only vertical boreholes. In directional drilling, specialized drill string components and "bottom hole assemblies" are used to induce, monitor, and control deviations in the path of the drill bit, so as to produce a borehole of desired non-vertical configuration.

Directional drilling is typically carried out using a downhole or mud motor incorporated into the bottom hole assembly (BHA) immediately above the drill bit. A typical downhole motor includes several primary components, such as, for example (in order, starting from the top of the motor assembly): (1) a top sub adapted to facilitate connection to the lower end of a drill string ("sub" being the common general term in the oil and gas industry for any small or secondary drill string component); (2) a power section; (3) a drive shaft enclosed within a drive shaft housing, with the upper end of the drive shaft being coupled to the lower end of the rotor of the power section; and (4) a bearing assembly (which includes a mandrel with an upper end coupled to the lower end of the drive shaft, plus a lower end adapted to receive a drill bit). The power section is typically a progressive cavity or positive displacement motor (PD motor). In a PD motor, the rotor comprises a shaft formed with one or more helical vanes or lobes extending along its length, and the stator is formed of an elastomer liner bonded to the inner cylindrical wall of the stator housing. The liner defines helical lobes complementary to that of the rotor lobe or lobes, but numbering one more than the number of rotor lobes. The lower end of the rotor comprises an output shaft, which in turn is coupled to the upper end of a drive shaft that drives the rotation of the drill bit.

In drilling operations employing a downhole motor, drilling fluid is circulated under pressure through the drill string and back up to the surface as previously described. However, in route to the drill bit, the pressurized drilling fluid flows through the power section of the downhole motor to generate rotational torque to rotate the drill bit. In particular, high-pressure drilling fluid is forced through the power section, causing the rotor to rotate within the stator, and inducing a pressure drop across the power section (i.e., the drilling fluid pressure being lower at the bottom of the power section). The power delivered to the output shaft is proportional to the product of the volume of fluid passing through the power section multiplied by the pressure drop across the power section (i.e., from fluid inlet to fluid outlet). Accordingly, a higher rate of fluid circulation fluid through the power section results in a higher rotational speed of the rotor within the stator, and correspondingly higher power output.

As previously noted, the output shaft is coupled to the upper end of the drive shaft, for transmission of rotational torque to the drill bit. However, the motion of the rotor in a PD motor is eccentric in nature, or "precessional"—i.e., in operation, the lower end of the rotor (i.e., the output end) rotates or orbits about the central longitudinal axis of the stator housing. The output shaft is coupled to the upper end of the drive shaft with a first (or upper) universal joint, thereby allowing rotational torque to be transferred from the rotor to the drive shaft irrespective of the eccentric motion of the rotor or fact that the output shaft and drive shaft are not coaxially aligned.

The bearing assembly typically incorporates an elongate tubular mandrel having an upper end coupled to the lower end of the drive shaft by means of a second (or lower) universal joint, and a lower end coupled to the drill bit. The mandrel is encased in a tubular bearing housing that connects to the tubular drive shaft housing above. The mandrel rotates concentrically within the bearing housing.

The universal joint assemblies of conventional driveshafts are prone to substantial wear and may fail relatively quickly during operation. In particular, many such conventional driveshafts transfer torque through either point or line contact(s), which disperse a large amount of force over a relatively small surface area, thereby tending to accelerate wear at such contact surfaces.

BRIEF SUMMARY OF THE DISCLOSURE

Some embodiments disclosed herein are directed to a driveshaft assembly. In an embodiment, the driveshaft assembly includes a driveshaft including a longitudinal shaft axis, a first end, a second end opposite the first end, and a radially outer surface. The first end includes a plurality of recesses extending radially inward from the radially outer surface, the recesses each comprising a planar engagement surface. In addition, the driveshaft assembly includes a first end housing including a longitudinal housing axis, and an axially extending receptacle. The receptacle includes a plurality of planar receptacle surfaces. Further, the driveshaft assembly includes a torque transfer assembly configured to transfer torque between the driveshaft and the first end housing. The torque transfer assembly includes a plurality of torque transfer keys each including a planar key surface and a convex key surface, and an adapter including a plurality of concave adapter surfaces and a plurality of planar adapter surfaces. The planar engagement surface of the each recess engages the planar key surface of one of the torque transfer keys. In addition, the convex key surface of each torque transfer key engages one of the concave adapter surfaces of the adapter. Further, each of the planar adapter surfaces of the adapter engage with one of the planar receptacle surfaces.

Other embodiments are directed to a driveshaft assembly. In an embodiment, the driveshaft assembly includes a driveshaft including a longitudinal shaft axis, a first end, a second end opposite the first end, and a radially outer surface. The first end includes a plurality of recesses extending radially inward from the radially outer surface, the recesses each comprising a convex engagement surface. In addition, the driveshaft assembly includes a first end housing including a longitudinal housing axis, and an axially extending receptacle. The receptacle includes a plurality of planar receptacle surfaces. Further, the driveshaft assembly includes a plurality of torque transfer keys configured to transfer torque between the driveshaft and first end housing, each of the torque transfer keys including a planar key surface and a concave key surface. The convex engagement surface of each recess engages the concave key surface of one of the torque transfer keys, and the planar key surface of each torque transfer key engages one of the planar receptacle surfaces.

Embodiments described herein comprise a combination of features and characteristics intended to address various shortcomings associated with certain prior devices, systems, and methods. The foregoing has outlined rather broadly certain of those features and characteristics of the disclosed embodiments in order that the detailed description that follows may be better understood. The various characteristics and features described above, as well as others, will be readily understood by those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the teachings disclosed herein.

BRIEF DESCRIPTION OF THE DRAWINGS

For a detailed description of various embodiments, reference will now be made to the accompanying drawings in which.

DETAILED DESCRIPTION OF EXEMPLARY EMBODIMENTS

Figure 1:
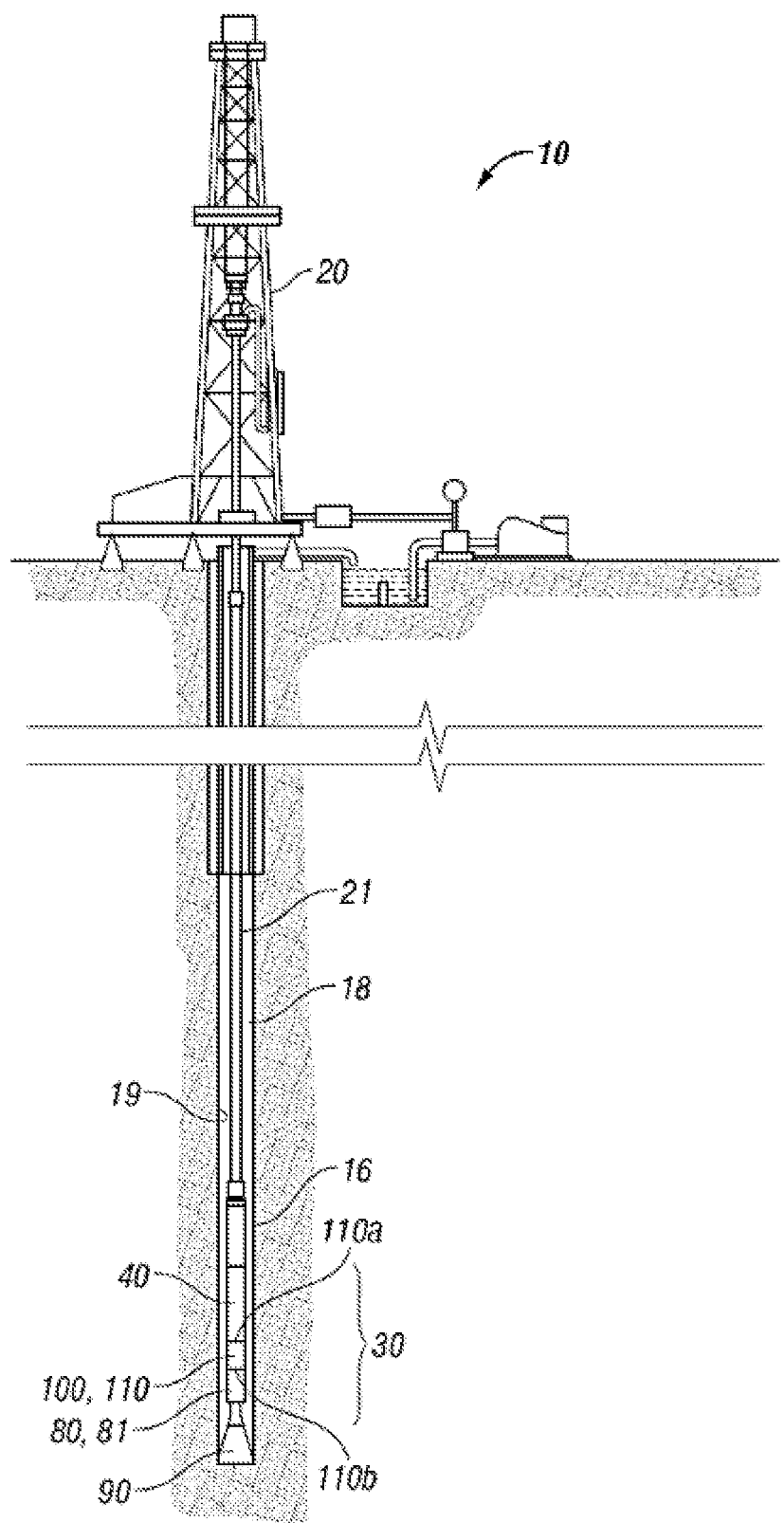
FIG. 1 is a schematic partial cross-sectional view of a drilling system including an exemplary embodiment of a driveshaft assembly in accordance with at least some embodiments.

The following discussion is directed to various exemplary embodiments. However, one of ordinary skill in the art will understand that the examples disclosed herein have broad application, and that the discussion of any exemplary embodiment is meant only to be illustrative of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection that is established via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

Referring now to FIG. 1, a system 10 for drilling a borehole 16 in an earthen formation is shown. In this embodiment, system 10 includes a drilling rig 20 disposed at the surface, a drill string 21 extending from rig 20 into borehole 16, a downhole motor 30, and a drill bit 90. Motor 30 forms a part of the bottomhole assembly ("BHA") and is disposed between the lower end of the drill string 21 and drill bit 90. Moving downward along the BHA towards bit 90, motor 30 includes a hydraulic drive or power section 40, a driveshaft assembly 100 coupled to power section 40, and a bearing assembly 80 coupled to driveshaft assembly 100. Bit 90 is coupled to the lower end of bearing assembly 80.

The hydraulic drive section 40 converts pressure exerted by drilling fluid pumped down drill string 21 into rotational torque that is transferred through driveshaft assembly 100 and bearing assembly 80 to drill bit 90. With force or weight applied to the drill bit 90, also referred to as weight-on-bit ("\NOB"), the rotating drill bit 90 engages the earthen formation and proceeds to form borehole 16 along a predetermined path toward a target zone. The drilling fluid or mud pumped down the drill string 21 and through motor 30 passes out of the face of drill bit 90 and back up the annulus 18 formed between drill string 21 and the sidewall 19 of borehole 16. The drilling fluid cools the bit 90, flushes the cuttings away from the face of bit 90, and carries the cuttings to the surface.

Figure 2:
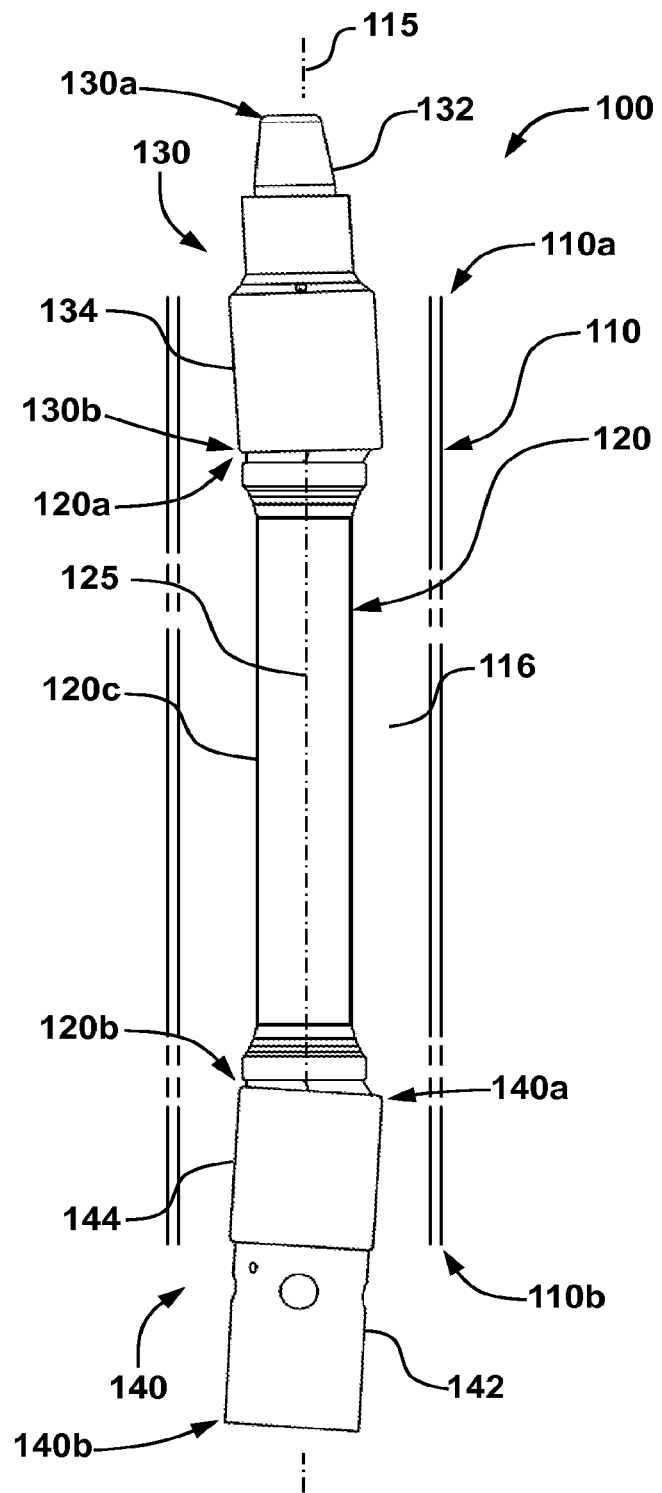
FIG. 2 is a partial cross-sectional side view of the driveshaft assembly of FIG. 1.

Referring now to FIG. 2, driveshaft assembly 100 includes an outer driveshaft housing 110, a driveshaft 120 rotatably disposed within housing 110, a first or upper end housing 130 coupled to driveshaft 120, and a second or lower end housing 140 also coupled to driveshaft 120. Housing 110 is an elongate, cylindrical tubular member having a central or longitudinal axis 115, a first or upper end 110a, and a second or lower end 110b opposite upper end 110a. As is best shown in FIG. 1, in this embodiment, housing 110 is coaxially aligned with hydraulic drive section 40 and bearing assembly 80. In addition, upper end 110a of housing 110 is coupled to an outer housing of drive section 40 and lower end 110b of housing 110 is coupled to an outer housing of bearing assembly 80.

Referring still to FIG. 2, driveshaft 120 has a central or longitudinal axis 125, a first or upper end 120a, a second or lower end 120b opposite end 120a, and a generally cylindrical radially outer surface 120c extending axially between ends 120a, 120b. As will be described in more detail below, axis 125 of shaft 120 is not coaxially aligned with axis 115 of housing 110. An annular space 116 is formed between drive shaft housing 110 and driveshaft 120. During drilling operations, drilling fluid is pumped down drill string 21 and through downhole motor 30 to drill bit 90. Within driveshaft assembly 100, drilling fluid flows through annular space 116 from upper end 110a to lower end 110b in route to bearing assembly 80 and drill bit 90.

Upper end housing 130 has a first or upper end 130a, a second or lower end 130b opposite end 130a, a connector section 132 extending from upper end 130a, and a socket section 134 extending from connector section 132 to lower end 130b. In this embodiment, connector section 132 is a male pin or ping end connector that threadably connects upper end housing 130 to the output shaft of hydraulic drive section 40. Socket section 134 receives upper end 120a of drive shaft 120. As will be described in more detail below, the coupling between upper end 120a and socket section 134 allows driveshaft 120 to pivot about end 120a relative to end housing 130 while simultaneously transferring rotational torque and axial thrust loads between end housing 130 and driveshaft 120.

Lower end housing 140 has a first or upper end 140a, a second or lower end 140b, a connector section 142 extending from upper end 140a, and a socket section 144 extending from connector section 142 to the lower end 140b. In this embodiment, connector section 142 is a female box or box-end connector that threadably connects lower end housing 140 to the mandrel of bearing assembly 80. Socket section 144 receives lower end 120b of driveshaft 120. As will be described in more detail below, the coupling between lower end 120b and socket section 144 allows driveshaft 120 to pivot about end 120b relative to end housing 140 while simultaneously transferring rotational torque and axial thrust loads between end housing 140 and driveshaft 120.

In this embodiment, ends 120a, 120b of driveshaft 120 are structurally identical, and socket sections 134, 144 are structurally identical. Therefore, in the description to follow and associated Figures, the details of embodiments of the lower end 120b, corresponding socket section 144, and the coupling or connection therebetween are shown and described, it being understood that embodiments of upper end 120a, corresponding socket section 134, and the connection therebetween, respectively, may be the same.

Figure 3:
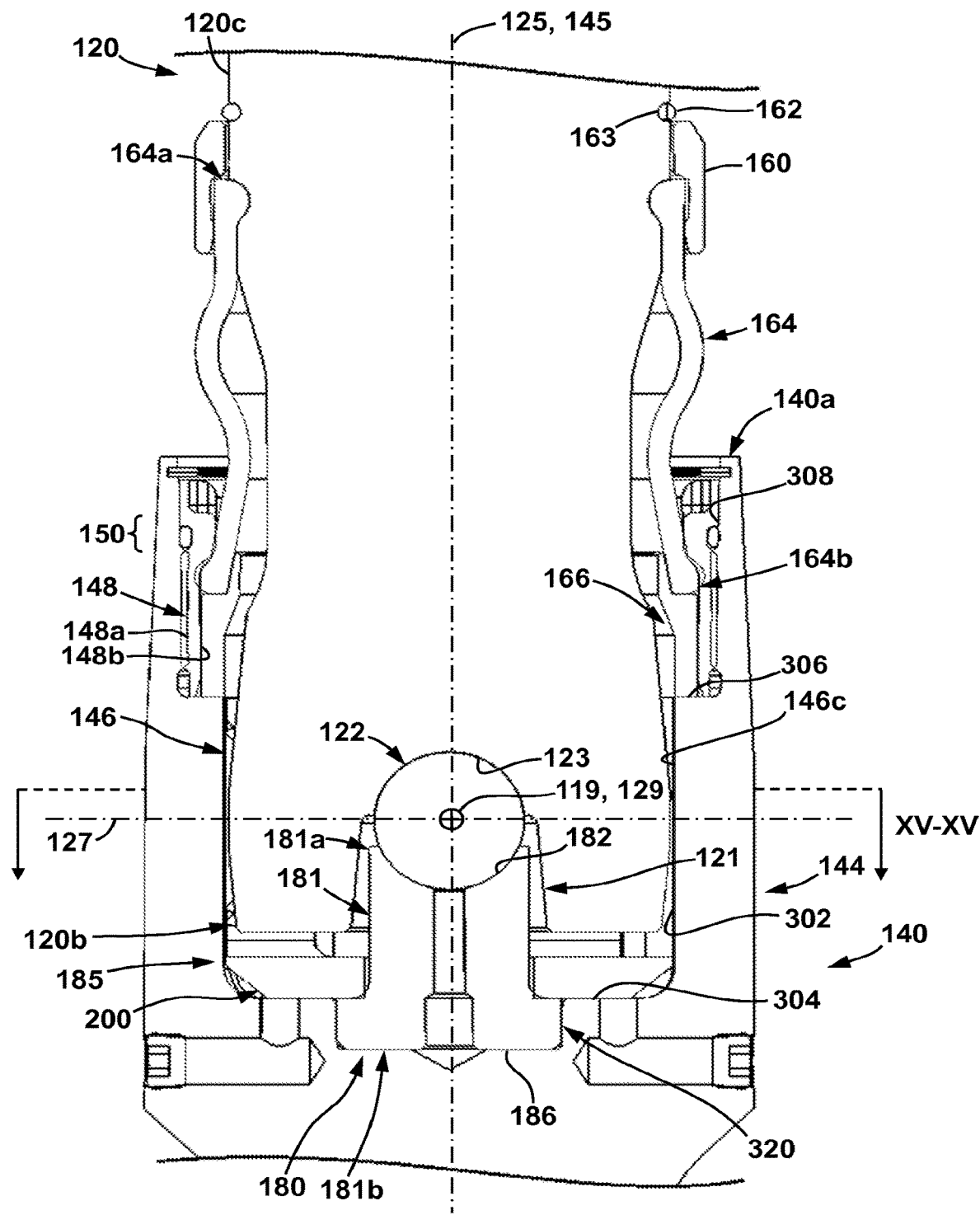
FIG. 3 is an enlarged cross-sectional side view of one of the universal joint assemblies of the driveshaft assembly of FIG. 1.

Referring now to FIG. 3, an embodiment of lower end 120b of driveshaft 120 and socket section 144 of lower end housing 140 are shown. Socket section 144 has a central or longitudinal axis 145 and includes a receptacle 146 that extends axially from end 140a and receives lower end 120b of driveshaft 120. It should be noted that, while axes 125, 145 are shown generally aligned in FIG. 3, the axis 125 of driveshaft 120 is typically misaligned with axis 145 of socket section 144 due to the pivoting of driveshaft 120 about end 120b during operations.

Figure 13:
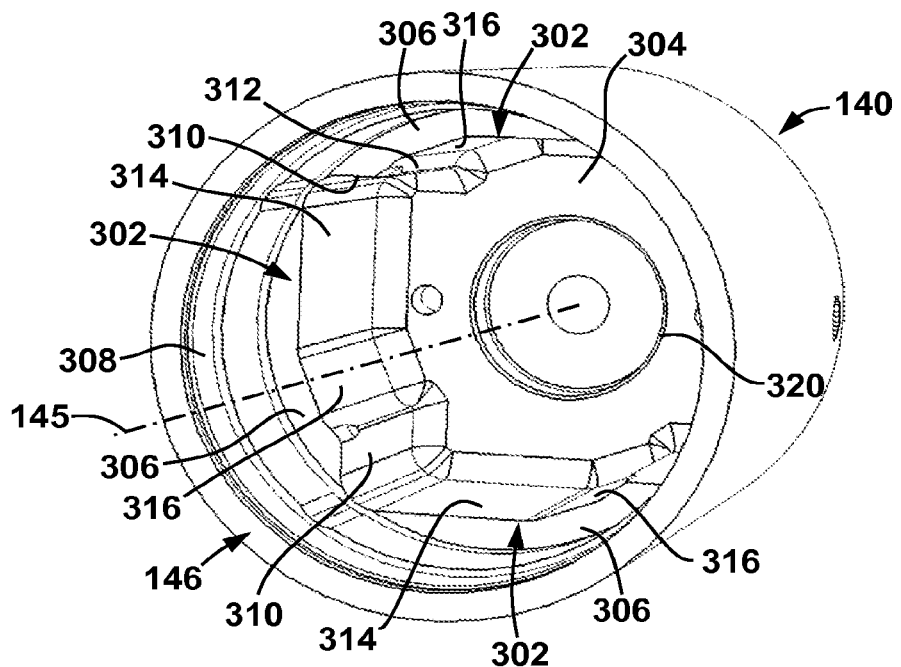
FIG. 13 is a perspective view of the end housing of the universal joint assembly of FIG. 3.
Figure 14:
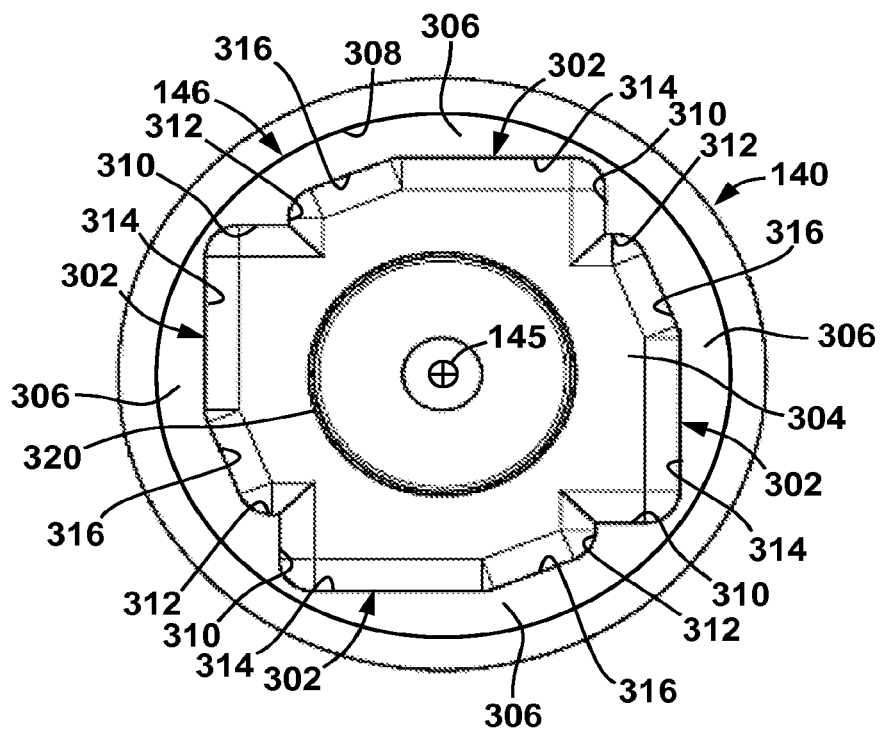
FIG. 14 is a front or axial view of the end housing of the universal joint assembly of FIG. 3.

Referring briefly to FIGS. 3, 13, and 14, receptacle 146 is defined by a radially inner surface 146c. Moving axially from upper end 140a, inner surface 146c includes an upper generally cylindrical surface 308 extending axially from upper end 140a, a plurality of circumferentially spaced shoulders 306 extending radially inward from surface 308 (e.g., in this embodiment, there are a total of four shoulders 306), a plurality of circumferentially spaced pockets 302 extending axially from shoulders 306, a generally planar surface 304 extending radially from pockets 302, and a cylindrical counterbore or recess 320 extending axially from surface 304. Shoulders 306 and surfaces 304 are planar surfaces disposed in planes oriented perpendicular to axis 145. In addition, in this embodiment, receptacle 146 includes a total of four pockets 302 spaced uniformly circumferentially about axis 145, such that each pocket 302 is disposed approximately 90° from each circumferentially adjacent pocket 302.

Referring back now to FIG. 3, in this embodiment, a bearing insert 180 is disposed within recess 320. Insert 180 includes a body 181 coaxially aligned with the axis 145 and having a first or upper end 181a, and a second or lower end 181b opposite the upper end 181a. In this embodiment, the upper end 181a includes a generally upward facing concave spherical bearing surface 182, and lower end 181b comprises a generally planar surface 186 oriented perpendicular to axis 145. As shown in FIG. 3, planar surface 186 of insert 180 is seated within recess 320 such that bearing surface 182 faces axially upward. As is shown in FIG. 3 lower end 120b of shaft 120 includes a cavity 121 extending axially inward from lower end 120b and having a concave spherical ball seat or surface 123 that receives a thrust sphere or ball 122. When lower end 120b is mounted within receptacle 146, upper end 181a of body 181 extends into cavity 121 such that concave spherical bearing surface 182 mates with and slidingly engages ball 122.

Referring still to FIG. 3, a mounting collar 148 is disposed within the receptacle 146 proximate upper end 140a. In general mounting collar includes a radially outer surface 148a, and a radially inner surface 148b. Collar 148 is threaded into receptacle 146, via engagement of mating external threads on outer surface 148a and internal threads on surface 308. An annular seal assembly 150 is radially positioned between surfaces 148a, 308 to prevent fluid flow therebetween.

A flexible closure boot 164 is provided to prevent drilling mud from flowing into receptacle 146 during drilling operations. Closure boot 164 is disposed about driveshaft 120 proximate lower end 120b and has a first or upper end 164a coupled to driveshaft 120 with a lock ring 160 and a second or lower end 164b coupled to end housing 140 with collar 148 and an L-shaped compression ring 166. Thus, closure boot 164 extends radially between driveshaft 120 and end housing 140. More specifically, upper end 164a of boot 164 is seated in an annular recess on outer surface 120c of driveshaft 120, and a lock ring 160 is disposed on shaft 120 over end 164a, thereby holding end 164a in position between ring 160 and shaft 120 via an interference fit. A snap ring 162 is disposed in a circumferential groove 163 in outer surface 120c and axially retains ring 160 on shaft 120. Lower end 164b of boot 164 is similarly held in position through an interference fit. In particular, lower end 164b is seated on radially inner surface 148b and compressed between collar 148 and compression ring 166 disposed in receptacle 146.

Figure 4:
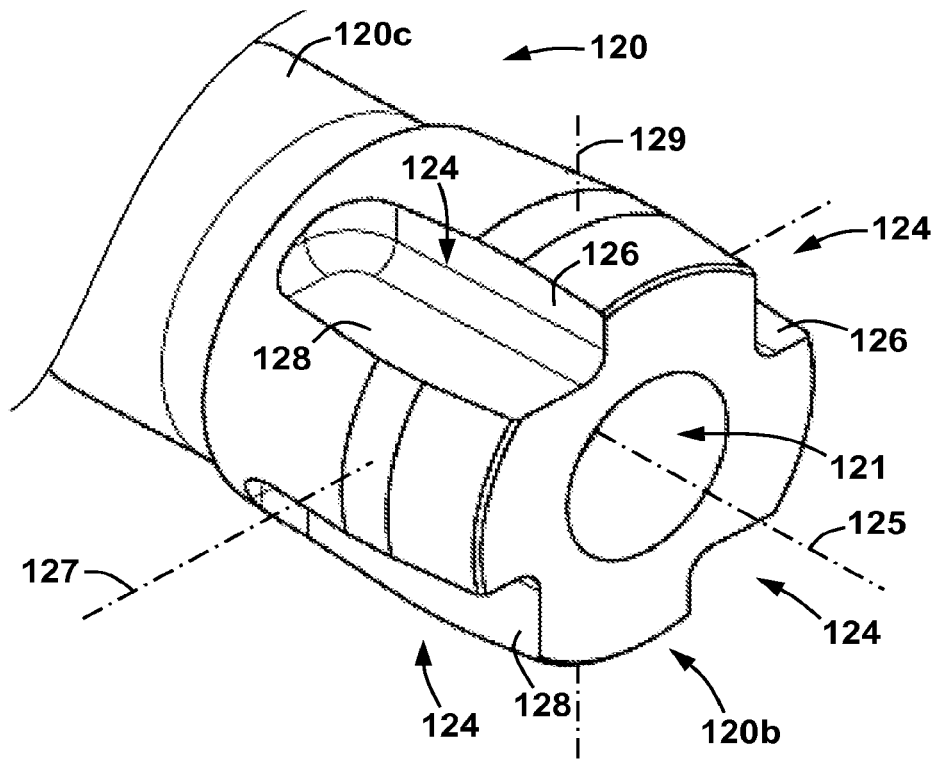
FIG. 4 is a perspective view of the lower end of the driveshaft of FIG. 1.
Figure 5:
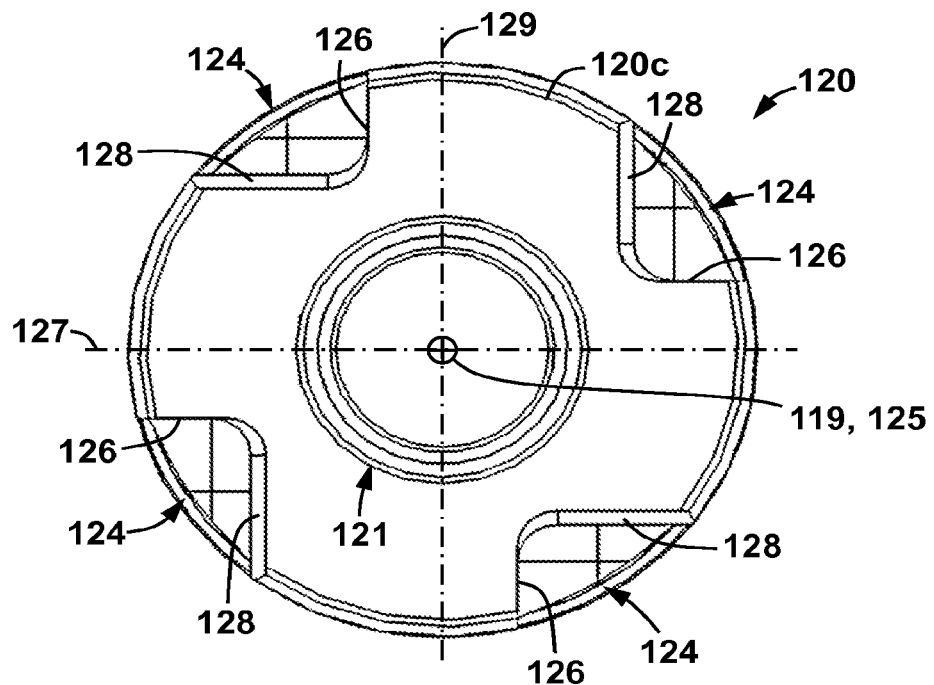
FIG. 5 is a front or axial view of the lower end of driveshaft of FIG. 1.

Referring now to FIGS. 3-5, lower end 120b of driveshaft 120 is shown. In addition to cavity 121 previously described, lower end 120b includes a plurality of recesses 124 extending both radially inward from outer surface 120c and axially from lower end 120b. Each recess 124 is at least partially defined by a first planar surface 126, and a second planar surface 128. In this embodiment, the surfaces 126, 128 of each recess 124 are each perpendicular to one another such that each recess 124 is substantially V-shaped when viewed in cross-section along axis 125 (e.g., as shown in FIG. 5). As will be described in more detail below, during drilling operations, torque is transferred from driveshaft 120 through the surface 126 of each recess 124, and thus, first planar surface 126 of each recess 124 may be referred to herein as an engagement or torque transfer surface 126.

In this embodiment, lower end 120b includes a total of four recesses 124 uniformly circumferentially disposed about axis 125 such that each recess 124 is disposed approximately 90° from each circumferentially adjacent recess 124. As a result, the planar surfaces 126, 128 of each recess 124 are generally parallel to the planar surface 126, 128, respectively, of each radially opposing recess 124 (i.e., the recess 124 disposed 180° from the recess 124 in question) with respect to axis 125. Moreover, in this embodiment, each of the surfaces 126, 128 are parallel to the central axis 125 of driveshaft 120; however, in other embodiments, surfaces 126, 128 are not parallel to axis 125 and are instead disposed at some non-zero angle thereto.

As will be described in more detail below, during rotation of shaft 120 about axis 125, shaft 120 is free to pivot at lower end 120b about a first pivot axis 127 and a second pivot axis 129. Axes 127, 129 are oriented orthogonal to each other and intersect at a center point 119 disposed along axis 125. Thus, axes 125, 127, 129 all intersect at center 119. In addition, axes 127, 129 lie in a plane oriented perpendicular or orthogonal to axis 125. Further, in this embodiment center 119 also corresponds to the center of curvature of concave spherical surface 123 in cavity and the center of thrust ball 122 when ball 122 is installed within cavity 121 as previously described (e.g., see FIG. 3). Thus, sliding engagement between thrust ball 122 and surface 123 of cavity 121 and sliding engagement between ball 122 and surface 182 of bearing insert 180 allows driveshaft 120 to pivot about center 119 during operations.

Figure 6:
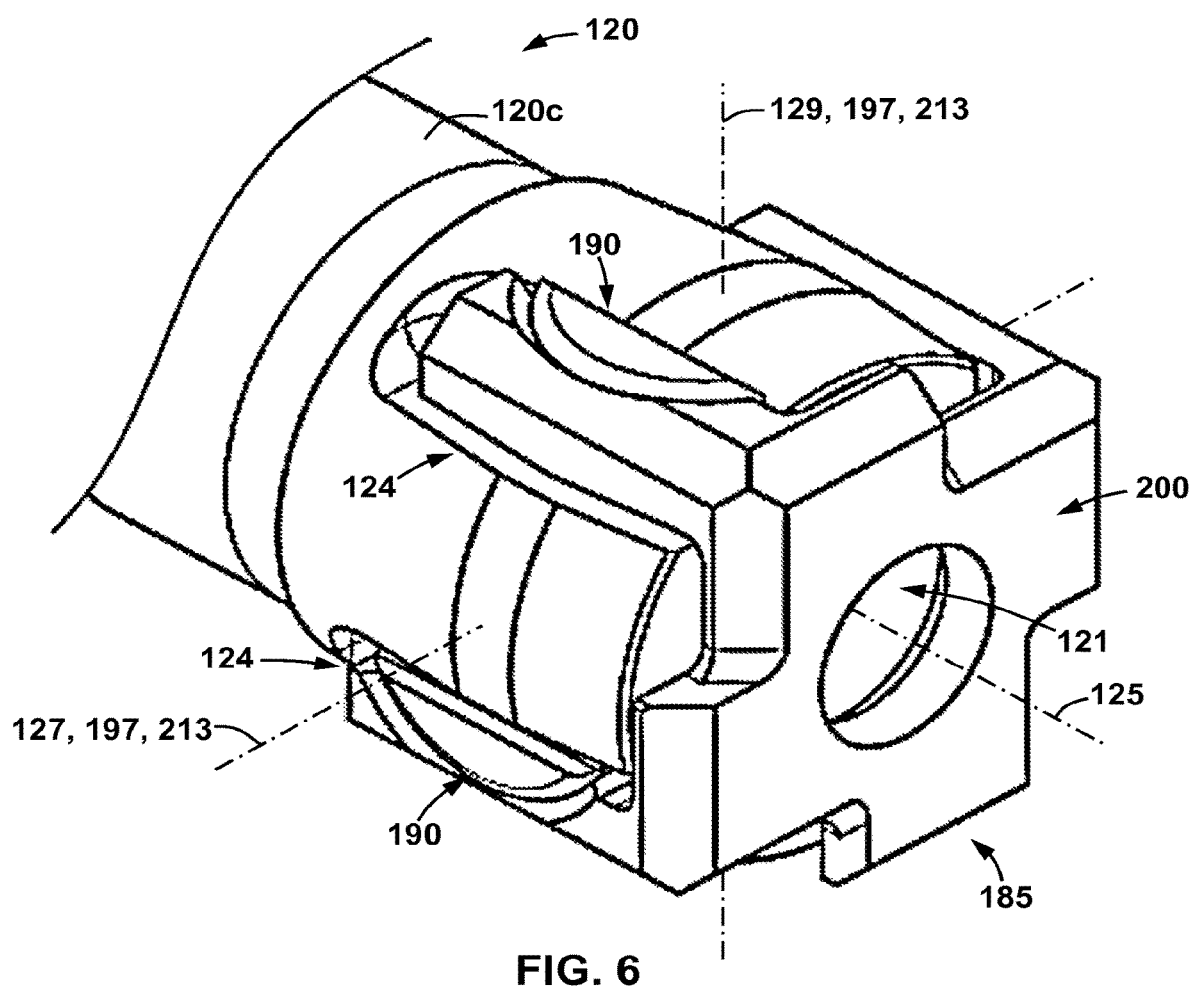
FIG. 6 is another perspective view of the lower end of the driveshaft of FIG. 1 illustrating the installation of a torque transfer assembly thereon in accordance with at least some embodiments.

Referring now to FIGS. 3 and 6, a torque transfer assembly 185 is disposed about lower end 120b of driveshaft 120 within receptacle 146 and transmits torque loads between driveshaft 120 and end housing 140 as driveshaft 120 rotates about axis 125. In this embodiment, torque transfer assembly 185 generally includes a plurality of torque transfer keys 190 and an adapter 200. As will be described in more detail below, sliding engagement of the various surfaces of torque transfer assembly 185 (i.e., mating surfaces of keys 190 and adapter 200) allow driveshaft 120 to transfer torque to end housing 140 through direct, face-to-face engagement even as driveshaft 120 pivots about axes 127, 129 relative to end housing 140 as previously described.

Figure 7:
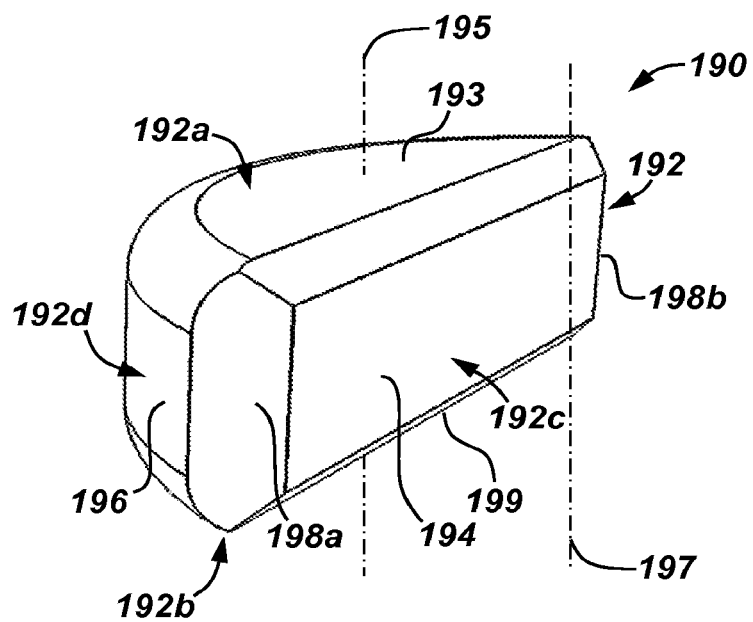
FIG. 7 is a perspective view of one of the torque transfer keys of the torque transfer assembly of FIG. 6.
Figure 8:
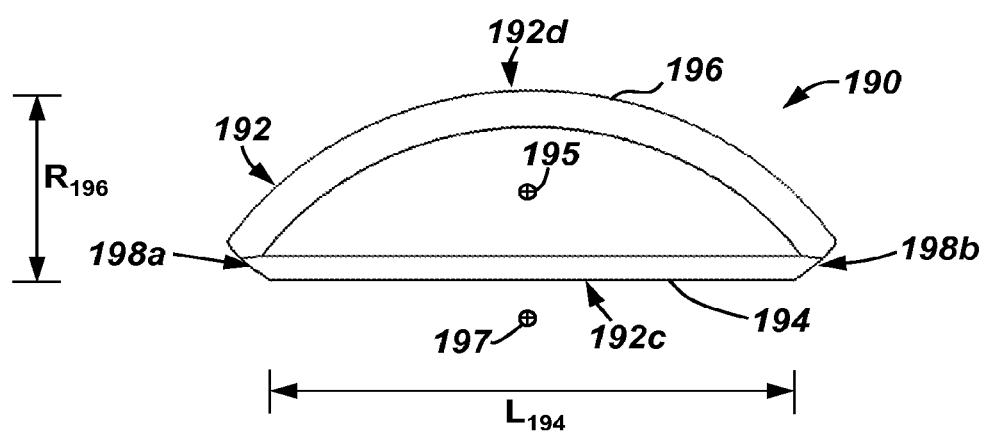
FIG. 8 is a top view of one of the torque transfer keys of the torque transfer assembly of FIG. 6.

Referring now to FIGS. 7 and 8, each of the torque transfer keys 190 is generally D-shaped and is disposed on adapter 200. As is best shown in FIG. 7, each key 190 comprises a body 192 having a central axis 195, a first or top side 192a, a second or bottom side 192b axially opposite the top side 192a, a first lateral side 192c, and a second lateral side 192d radially opposite the first lateral side 192c. In this embodiment, the axis 195 passes through the center of mass of key 190 and is parallel to one of the axes 127, 129 when driveshaft assembly 100 is fully made up. In addition, in this embodiment, sides 192a, 192b comprise parallel planar surfaces 193, 199, respectively, oriented perpendicular to axis 195; side 192c comprises a planar torque transfer surface 194 extending axially between sides 192a, 192b; and side 192d comprises a convex cylindrical surface 196 extending axially between sides 192a, 192b. Surface 196 is concentric about an axis of curvature 197 that is oriented parallel to axis 195 and surface 194, and radially spaced from axis 195 and surface 194. Axes 195, 197 lie in a plane oriented perpendicular to surface 194. Further, in this embodiment surfaces 194, 196 each intersect chamfered surfaces 198a, 198b, such that surface 194 has a length $L_{194}$ extending between surfaces 198a, 198b; however, it should be appreciated that other embodiments of keys 190 may not include chamfered surfaces 198a, 198b. Still further, surface 196 has a radius $R_{196}$ measured radially from axis of curvature 197 to surface 196. Moreover, as will be described in more detail below, in this embodiment, axis 197 of each key 190 is aligned with one of the pivot axes 127, 129 when assembly 100 is fully made up.

Figure 9:
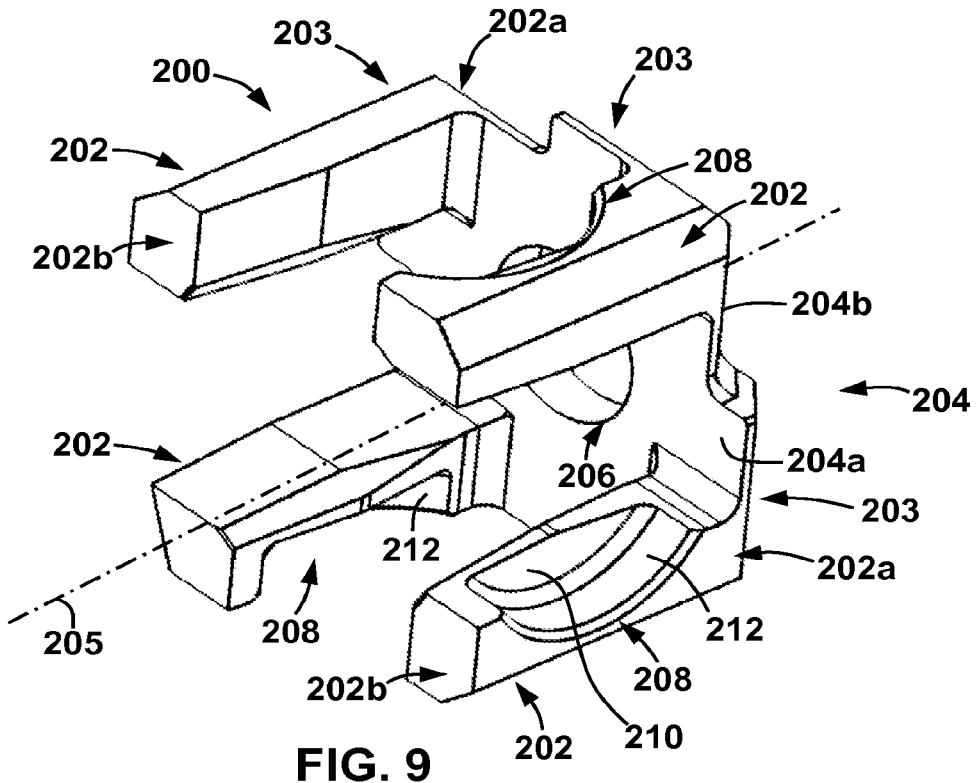
FIG. 9 is a perspective view of the adapter of the torque transfer assembly of FIG. 6.
Figure 10:
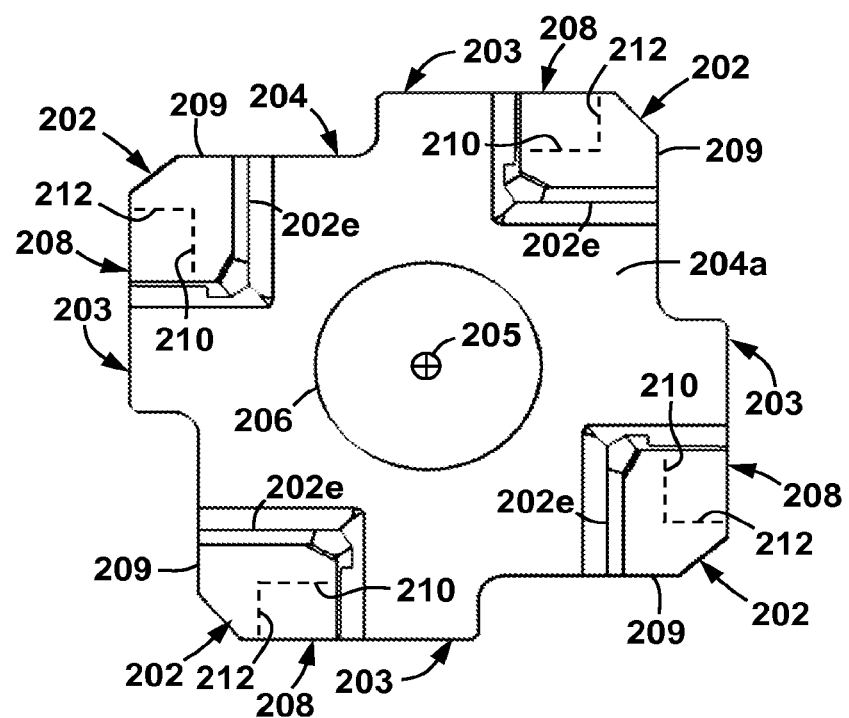
FIG. 10 is a top view of the adapter of the torque transfer assembly of FIG. 6.
Figure 11:
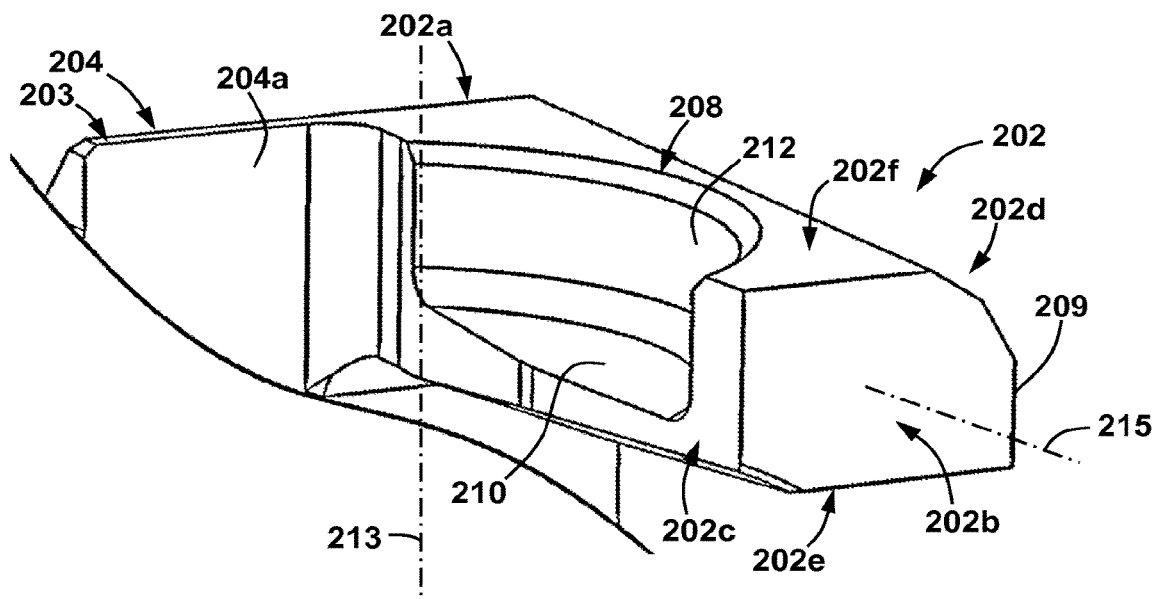
FIG. 11 is an enlarged perspective view of one of the arms of the adapter of the torque transfer assembly of FIG. 6.

Referring now to FIGS. 9-11, adapter 200 includes a central or longitudinal axis 205 that is aligned with axis 145 of end housing 140 when adapter 200 is installed within receptacle 146 (e.g., as shown in FIG. 3), a plurality of engagement arms 202, and a central connecting member 204. Connecting member 204 is formed of a single plate that includes a first or upper side 204a and a second or lower side 204b opposite upper side 204a, where sides 204a, 204b are parallel to one another and are each perpendicular to axis 205. In addition, member 204 is shaped to correspond with receptacle 146. Namely, in this embodiment, connecting member 204 includes a plurality of radial extensions 203 that generally correspond in shape and arrangement with pockets 302 of receptacle 146 previously described such that each extension 203 fits within one of the pockets 302 of receptacle 146 when adapter 200 is fully installed therein. Thus, in this embodiment adapter 200 includes a total of four extensions 203 that are uniformly circumferentially spaced about axis 205 such that each extension 203 is disposed approximately 90° from each circumferentially adjacent extension 203. In addition, one arm 202 extends axially outward from upper side 204a on each of the extensions 203, such that in this embodiment, there are a total of four arms 202 uniformly circumferentially spaced about axis 205 and each arm 202 is disposed approximately 90° from each circumferentially adjacent arm 202. In addition, a hole or aperture 206 extends axially through member 204, between sides 204a, 204b and is coaxially aligned with axis 205. As will be described in more detail below, hole 206 is sized to allow passage of upper end 181a of body 181 of bearing insert 180 therethrough during operations.

As is best shown in FIG. 11, each arm 202 includes central axis 215 that is parallel to and radially spaced from axis 205 of adapter 200, a first end 202a, and a second end 202b opposite first end 202a. In addition, each arm 202 includes a first driveshaft facing side 202c, a first end housing facing side 202d radially opposite first driveshaft facing side 202c with respect to axis 215, a second driveshaft facing side 202e extending between sides 202c, 202d, and a second end housing facing side 202f also extending between sides 202c, 202d and radially opposite second driveshaft facing side 202e with respect to axis 215. Each side 202c, 202d, 202e, 202f extends axially between ends 202a, 202b. First end housing facing side 202d includes an axially extending planar engagement surface 209, while a cylindrical recess 208 extends radially inward from side 202c with respect to axis 215. Recess 208 is defined by a concave cylindrical surface 212 having an axis of curvature 213 and a planar floor surface 210 extending between side 202c and concave cylindrical surface 212.

Figure 12:
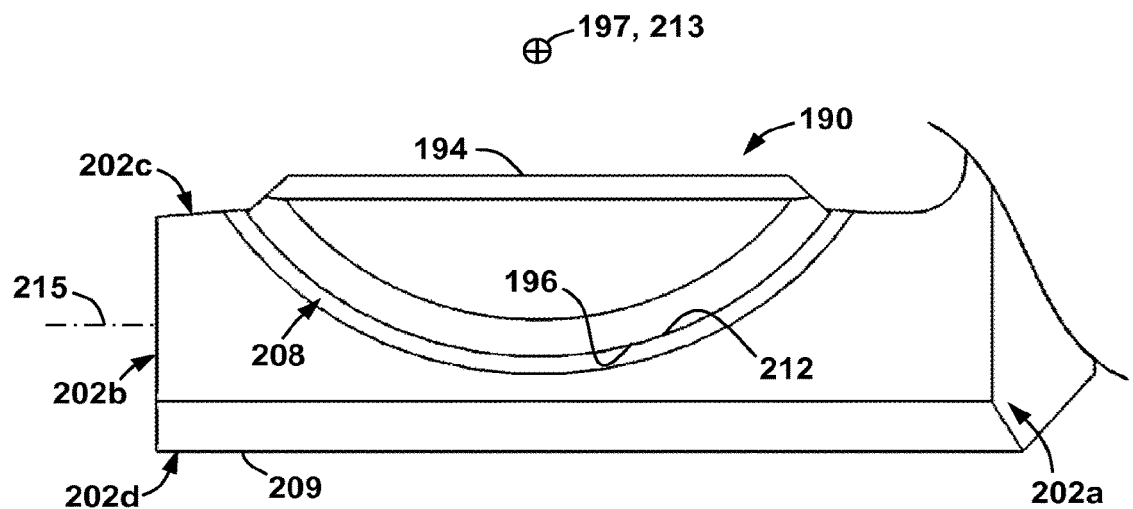
FIG. 12 is an enlarged top view of one of the arms of the adapter of the torque transfer assembly of FIG. 6 illustrating the installation of one of the torque transfer keys of FIG. 6 thereon.

Referring now to FIGS. 6 and 12, during make up of torque transfer assembly 185, each of the keys 190 are disposed within one of the recesses 208 on arms 202 of adapter 200. In particular, each key 190 is disposed within one of the recesses 208 such that one of the parallel planar surfaces 193, 199 slidingly engages floor surface 210, and convex cylindrical surface 196 slidingly engages concave cylindrical surface 212. In addition, as is best shown in FIG. 12, when keys 190 are disposed within recesses 208 as described above, the axis of curvature 197 of each surface 196 on each key 190 aligns with and is therefore coincident with the axis of curvature 213 of the respective, corresponding surface 212 in recess 208. Thus, during operations, each key 190 is allowed to pivot or rotate about the aligned axes 197, 213 through sliding engagement of the surfaces 196, 212 and sliding engagement of one of the surfaces 193, 199 and the surface 210. In addition, as will be described in more detail below, in this embodiment when assembly 185 is fully installed on lower end 120b of driveshaft 120 and lower end 120b and assembly 185 are both fully inserted within receptacle 146 of end housing 140 (e.g., FIG. 3), the aligned axes 197, 213 of each of the arm 202 and key 190 pairs are further aligned with one of the pivot axes 127, 129, previously described, such that during operation, each of the keys 190 pivot or rotate about one of the pivot axes 127, 129 to further facilitate pivoting of driveshaft 120 about axes 127, 129 relative to end housing 140.

Referring again to FIGS. 13 and 14, in this embodiment each pocket 302 of receptacle 146 is defined by a first planar surface 310, a second planar surface 312 parallel to the first planar surface 310, a third planar surface 314 extending perpendicularly or orthogonal from the first planar surface 310, and a fourth planar surface 316 extending between surfaces 312, 314. In this embodiment, each of the surfaces 310, 312, 314, 316 extend axially or parallel to axis 145 of end housing 140; however, such an arrangement is not required such that in other embodiments, surfaces 310, 312, 314, 316 are disposed at some non-zero angle to axis 145. As will be described in more detail below, each of the first planar surfaces 310 of pockets 302 engage with mating surfaces in torque transfer assembly 185 (e.g., planar surfaces 209 on arms 202) in order to transfer torque between shaft 120 and end housing 140 during rotation of driveshaft 120 about axis 125. Thus, surfaces 310 may be referred to herein as either engagement or torque transfer surfaces.

As is also best shown in FIG. 14, pockets 302 are arranged within receptacle 146 such that the first planar engagement surface 310 of each pocket 302 extends to the second planar surface 312 of the immediately circumferentially adjacent pocket 302. In addition, the first planar engagement surfaces 310 of radially opposing pockets 302 (i.e., pockets 302 that are circumferentially disposed 180° from one another about axis 145) are generally parallel to one another. Such a parallel relationship of surfaces 310 ensures that torque transfer between driveshaft 120 and end housing 140 is more evenly distributed.

Figure 15:
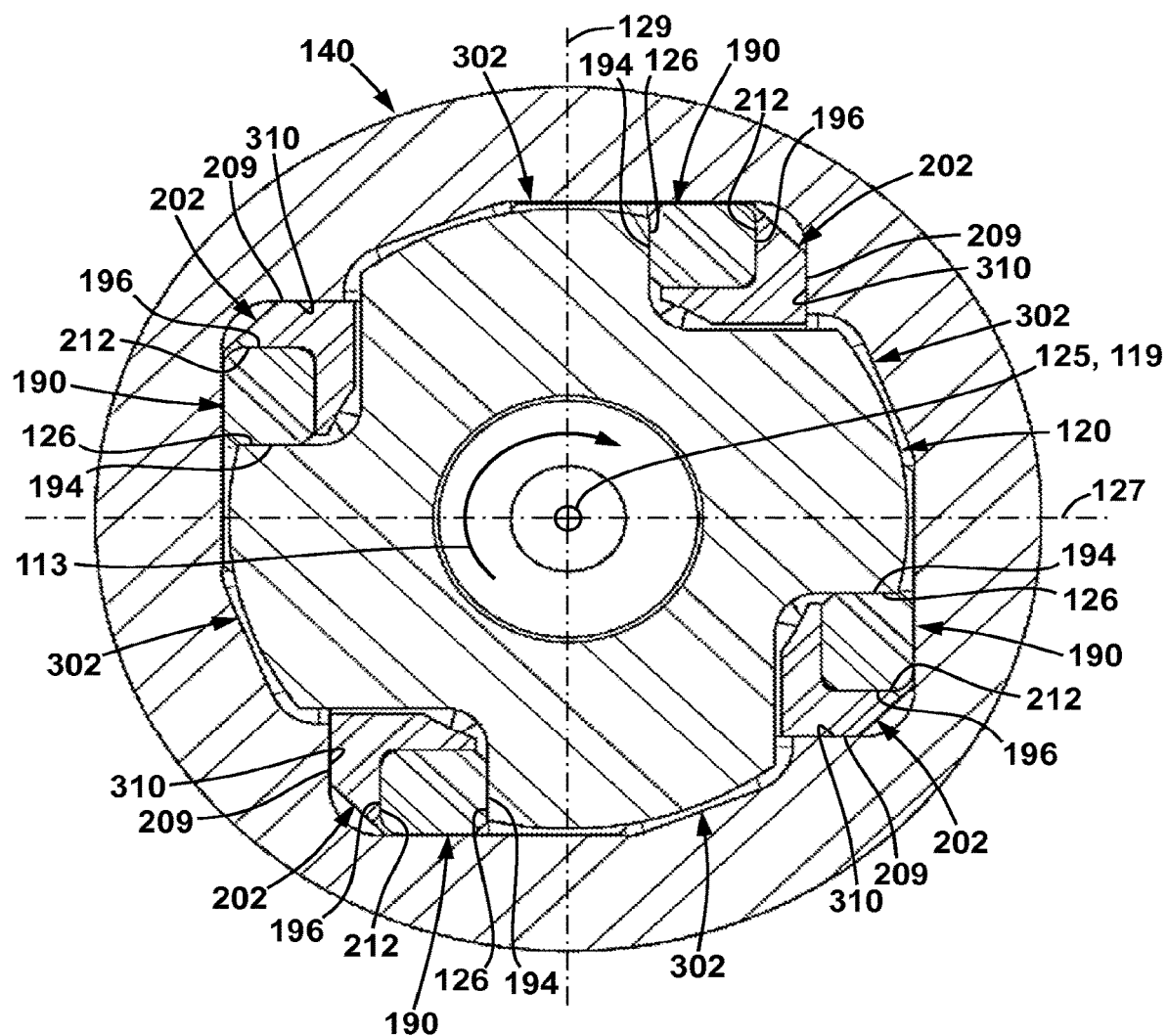
FIG. 15 is a cross-sectional view of the universal joint assembly taken along section XV-XV of FIG. 3.

Referring now to FIGS. 3, 6, and 15, the assembly of lower end 120b of driveshaft 120, torque transfer assembly 185, and end housing 140 will now be described. First, as is best shown in FIG. 6, torque transfer assembly 185 is made up as previously described above and installed on lower end 120b of driveshaft 120 such that each mating pair of keys 190 and arms 202 is disposed within one of the recesses 124 on lower end 120b. In particular, keys 190 and adapter 200 are installed on lower end 120b of driveshaft 120 such that planar surfaces 194 engage with planar surfaces 126 and second driveshaft facing sides 202e of each arms 202 oppose planar surfaces 128 within recesses 124. In addition, when adapter 200 is fully installed on lower end 120b, hole 206 is generally aligned with cavity 121. Further, as is shown in FIG. 6, when torque transfer assembly 185 is installed on lower end 120b in this embodiment, the aligned axes 197, 213 of surfaces 196, 212, respectively are further aligned with one of the pivot axes 127, 129. As will be described in more detail below, such alignment with axes 197, 213, 127, 129 allows keys 190 to pivot about one of the axes 127, 129 to further facilitate pivoting of driveshaft 120 about axes 127, 129 during drilling operations. In this embodiment, either prior or subsequent to installation of torque transfer assembly 185 on lower end 120b, thrust ball 122 is installed within cavity 121 and is seated on concave spherical bearing surface 123 (e.g., see FIG. 3).

As is best shown in FIGS. 3 and 15, lower end 120b of driveshaft 120, with torque transfer assembly 185 installed thereon, is then inserted within receptacle 146 on end housing 140 such that lower side 204b abuts or engages with planar surface 304, and upper end 181a of body 181 of bearing insert 180 extends through hole 206 and cavity 121 such that concave spherical bearing surface 182 on upper end 181a engages thrust ball 122. Therefore, thrust ball 122 is disposed between and engaged with concave spherical bearing surfaces 123, 182 as shown in FIG. 3. In addition, as lower end 120b of driveshaft 120 and torque transfer assembly 185 are installed within receptacle 146, each of the surfaces 209 of first end housing facing sides 202d on arms 202 engages with one of the engagement surfaces 310 of pockets 302 as shown in FIG. 15.

Referring still to FIGS. 3 and 15, once driveshaft assembly 100 is fully made up, driveshaft 120 is free to pivot relative to lower end housing 140 about center 119, while rotating about axis 125 in direction 113. In particular, as shaft 120 rotates about axis 125 in direction 113, end 120b of shaft 120 can pivot about one or both of the axes 127, 129 through sliding engagement of thrust ball 122 on surface 123 within cavity 121 and concave spherical bearing surface 182 of insert 180. Additionally, pivoting of end 120b of driveshaft 120 about axes 127, 129 is further accommodated by sliding engagement of cylindrical surface 196 of each key 190 and cylindrical surface 212 within recesses 208 on arms 202 of adapter 200 as well as sliding engagement of surfaces 194 on each key 190 and planar surfaces 126 on lower end 120b of driveshaft 120.

Moreover, during rotation of shaft 120 about axis 125 in direction 113, torque is transferred between lower end 120b and end housing 140 through torque transfer assembly 185. In particular, torque is first transferred between lower end 120b and keys 190 through engagement of surfaces 126, 194. Thereafter, torque is transferred between keys 190 and adapter 200 through engagement of surfaces 196, 212. Finally, torque is transferred between adapter 200 and end housing 140 through engagement of surfaces 209, 310. Because keys 190 are allowed to pivot about one of the axes 127, 129 within recesses 208 on arms 202 of adapter 200 in this embodiment as previously described, keys 190 are able to maintain face-to-face contact between surfaces 194, 126 as driveshaft 120 pivots about axes 127, 129 simultaneous with rotation about axis 125 in direction 113. In this embodiment, the coupling between upper end housing 130 and upper end 120a of driveshaft 120 is structurally and functionally the same as the coupling between lower end housing 140 and lower end 120b of driveshaft described above; however, it should be appreciated that such structural symmetry is not required. In addition, while a specific order of assembly has been described above for lower end 120b of driveshaft 120, it should be appreciated that the specific assembly order may be greatly varied. For example, in some embodiments, the torque transfer assembly 185 may initially be installed within receptacle 146. Thereafter, in this example, lower end 120b is inserted within receptacle 146 and engaged with assembly 185 in the manner previously described, thereby resulting in the arrangement shown in FIG. 15.

In the manner described, through direct engagement of such mating surfaces (e.g., mating surfaces on keys 190, adapter 200, driveshaft 120, and receptacle 146), driveshaft assembly 100 enables the transfer of torque through direct, face-to-face surface contact as opposed to point or line contact. Moreover, for driveshaft assembly 100, face-to-face surface contact is maintained between mating surfaces (e.g., mating surfaces on driveshaft 120, torque transfer assembly 185, and end housing 140), even as the driveshaft pivots about orthogonal pivot axes (e.g., pivot axes 127, 129). Torque transfer through such direct, face-to-face contact of surfaces offers the potential to greatly reduce the rate of wear between the interacting surface and thereby increase the running life of the driveshaft assembly (e.g., assembly 100) and other related components.

While driveshaft assembly 100 has been described herein to include a driveshaft 120 with structurally identical ends 120a, 120b as well as structurally identical socket sections 134, 144, it should be appreciated that other embodiments may not include such structural symmetry. Further, while pockets 302 within receptacle 146 have been described as being defined by surfaces 310, 312, 314, 316, it should be appreciated that the exact size, shape, number, and arrangement of pockets 302 within receptacle 146 may be greatly varied. Thus, embodiments of pockets 302 may assume any suitable shape that presents one or more engagement surfaces for engagement with mating surfaces on torque transfer assembly 185. Moreover, the specific shape and arrangement shown for pockets 302 in the Figures is merely illustrative of one potential option for the design of pockets 302, and there is no intent to limit other potential embodiments of pockets 302 to the specific shape shown therein. Similarly, it should also be appreciated that the specific number, shape, arrangement, and surfaces defining recesses 124 on driveshaft 120 may be greatly varied in the same manner, and may assume any suitable shape, arrangement, number, etc., that presents one or more engagement surfaces for engagement with mating surfaces on torque transfer assembly 185. Still further, while embodiments of driveshaft 120 disclosed herein have included a spherical thrust ball 122, it should be appreciated that in other embodiments, driveshaft 120 may not include cavity 121 and/or thrust ball 122. For example, in some embodiments, driveshaft 120 includes a convex spherical bearing surface on end 120a and/or end 120b in place of thrust ball 122 and/or cavity 121

Figure 16:
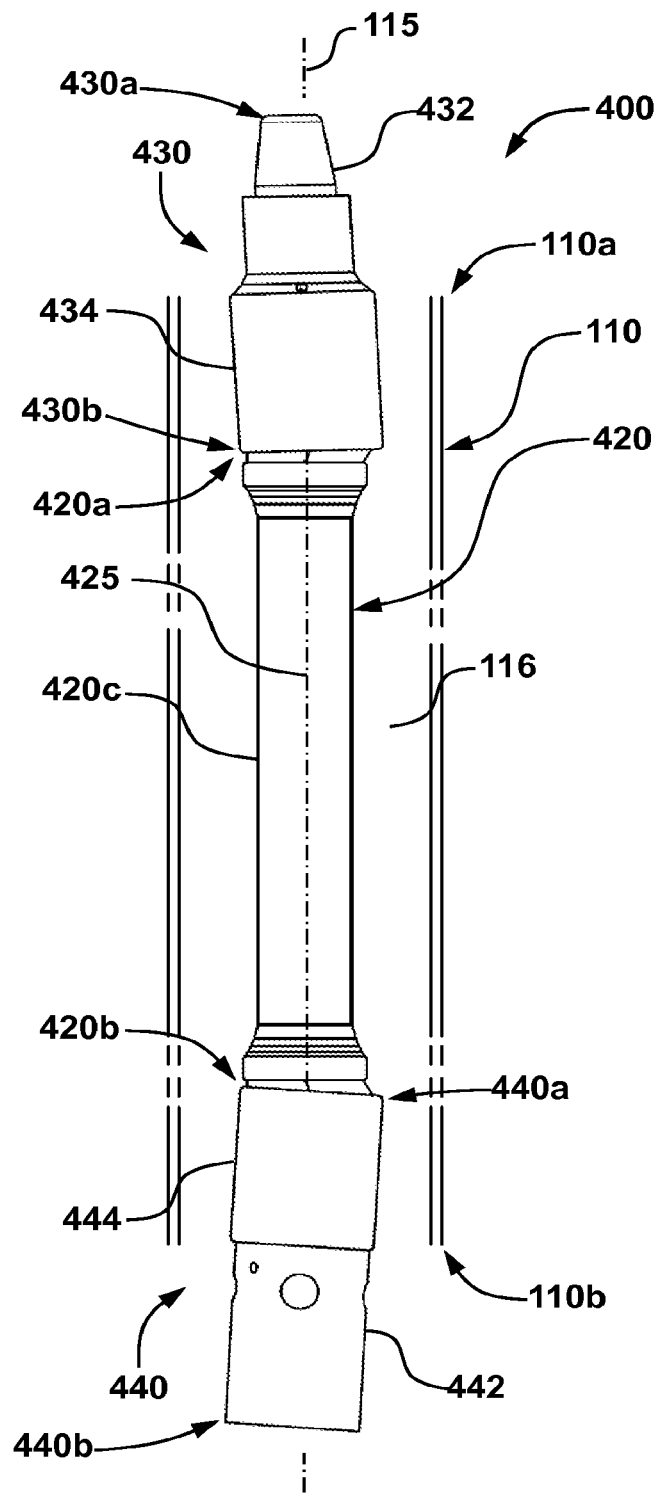
FIG. 16 is a partial cross-sectional side view of another driveshaft assembly for use within the drill system of FIG. 1.

Referring now to FIG. 16, another embodiment of driveshaft assembly 400 is shown. Driveshaft assembly 400 is substantially the same as driveshaft assembly 100 previously described, and thus, like numerals are used to indicate like components and the description below will generally focus on the differences between assemblies 100, 400. Specifically, driveshaft assembly 400 includes the outer driveshaft housing 110, a driveshaft 420 rotatably disposed within housing 110, a first or upper end housing 430 coupled to driveshaft 420, and a second or lower end housing 440 also coupled to driveshaft 420.

Referring still to FIG. 16, driveshaft 420 has a central or longitudinal axis 425, a first or upper end 420a, a second or lower end 420b opposite end 420a, and a generally cylindrical radially outer surface 420c extending axially between ends 420a, 420b. As will be described in more detail below, axis 425 of shaft 420 is not coaxially aligned with axis 115 of housing 110.

Upper end housing 430 has a first or upper end 430a, a second or lower end 430b opposite end 430a, a connector section 432 extending from upper end 430a, and a socket section 434 extending from connector section 432 to lower end 430b. In this embodiment, connector section 432 is a male pin or ping end connector that threadably connects upper end housing 430 to the output shaft of hydraulic drive section 40 (see FIG. 1). Socket section 434 receives upper end 420a of drive shaft 420. As will be described in more detail below, the coupling between upper end 420a and socket section 434 allows driveshaft 420 to pivot about end 420a relative to end housing 430 while simultaneously transferring rotational torque and axial thrust loads between end housing 430 and driveshaft 420.

Lower end housing 440 has a first or upper end 440a, a second or lower end 440b, a connector section 442 extending from upper end 440a, and a socket section 444 extending from connector section 442 to the lower end 440b. In this embodiment, connector section 442 is a female box or box-end connector that threadably connects lower end housing 440 to the mandrel of bearing assembly 80 (see FIG. 1). Socket section 444 receives lower end 420b of driveshaft 420. As will be described in more detail below, the coupling between lower end 420b and socket section 444 allows driveshaft 420 to pivot about end 420b relative to end housing 440 while simultaneously transferring rotational torque and axial thrust loads between end housing 440 and driveshaft 420.

In this embodiment, ends 420a, 420b of driveshaft 420 are structurally identical, and socket sections 434, 444 are structurally identical. Therefore, in the description to follow and associated Figures, the details of lower end 420b, corresponding socket section 444, and the connection therebetween are shown and described, it being understood that upper end 420a, corresponding socket section 434, and the connection therebetween, respectively, are the same.

Figure 17:
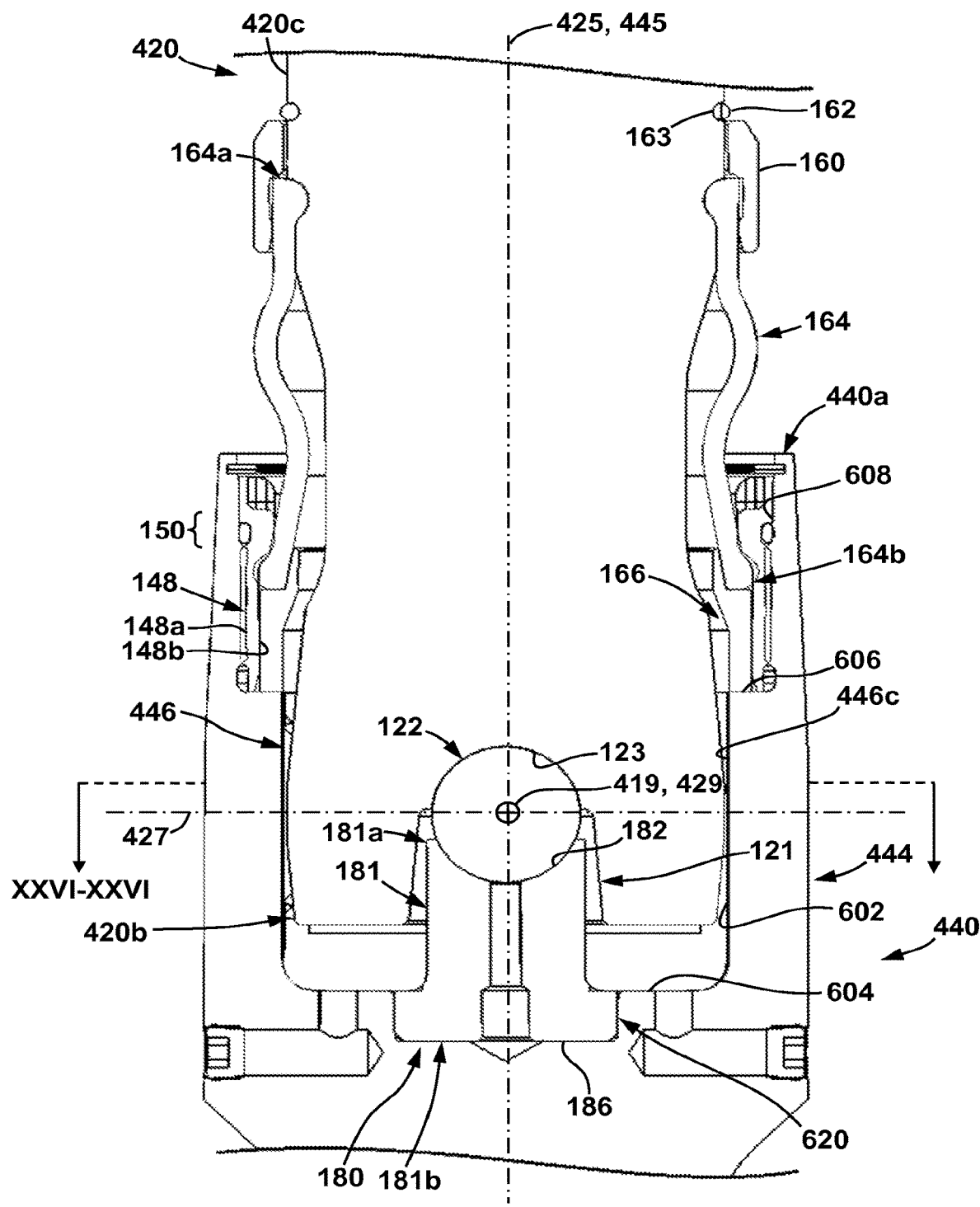
FIG. 17 is an enlarged cross-sectional side view of another universal joint assembly for use in the driveshaft assembly of FIG. 1 in accordance with at least some embodiments.

Referring now to FIG. 17, lower end 420b of driveshaft 420 and socket section 444 of lower end housing 440 are shown. Socket section 444 has a central or longitudinal axis 445 and includes a receptacle 446 that extends axially from end 440a and receives lower end 420b of driveshaft 420. While axis 425 of driveshaft 420 and axis 445 are shown generally aligned in FIG. 17, it should be noted that the axis 425 of driveshaft 420 is typically misaligned with axis 445 of socket section 444 due to the pivoting of driveshaft 420 about end 420b during operations.

Figure 23:
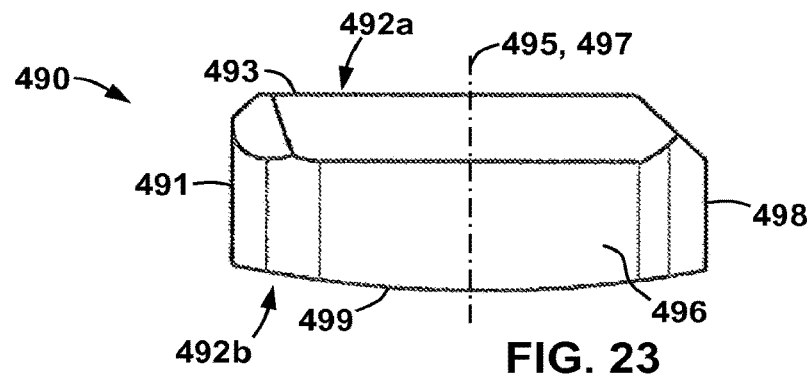
FIG. 23 is a front view of one of the torque transfer keys of FIG. 20.
Figure 24:
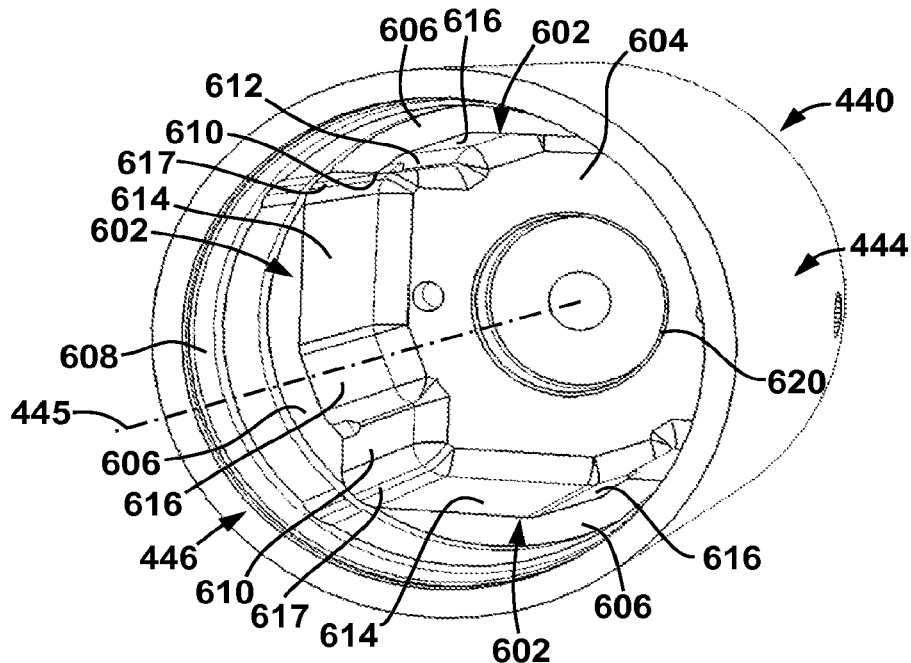
FIG. 24 is a perspective view of the end housing of the universal joint assembly of FIG. 17.

Referring briefly to FIGS. 17, 23, and 24, receptacle 446 is defined by a radially inner surface 446c. Moving axially from upper end 440a, inner surface 446c includes an upper generally cylindrical surface 608 extending axially from upper end 440a, a plurality of circumferentially spaced shoulders 606 extending radially inward from surface 608 (e.g., in this embodiment, there are a total of four shoulders 606), a plurality of circumferentially spaced pockets 602 extending axially from shoulders 606, a generally planar surface 604 extending radially from pockets 602, and a cylindrical counterbore or recess 620 extending axially from surface 604. Shoulders 606 and surfaces 604 are planar surfaces disposed in planes oriented perpendicular to axis 445. In addition, in this embodiment, receptacle 446 includes a total of four pockets 602 spaced uniformly circumferentially about axis 445, such that each pocket 602 is disposed approximately 90° from each circumferentially adjacent pocket 602.

Referring back now to FIG. 17, in this embodiment, bearing insert 180, being the same as previously described above, is disposed within recess 620. Insert 180 interacts with recess 620 in substantially the same manner as described above for insert 180 and recess 320 (see FIG. 3), and thus, a detailed description of the structure of insert 180 and its interaction with recess 620 is omitted in the interests of brevity. In addition, as is also shown in FIG. 17, like lower end 120b, previously described, lower end 420b of shaft 420 includes cavity 121 that receives the thrust ball 122 in the same manner as previously described above. As a result, when lower end 420b is mounted within receptacle 446, upper end 181a of body 181 extends into cavity 121 such that concave spherical bearing surface 182 mates with and slidingly engages ball 122. Further, as shown in FIG. 17, mounting collar 148, closure boot 164, rings 160, 163, 166 are couple to lower end 420b and/or socket section 444 in substantially the same manner as described above for lower end 120b and socket section 144, respectively. Therefore, a detailed description of these components is also omitted in the interest of brevity.

Figure 18:
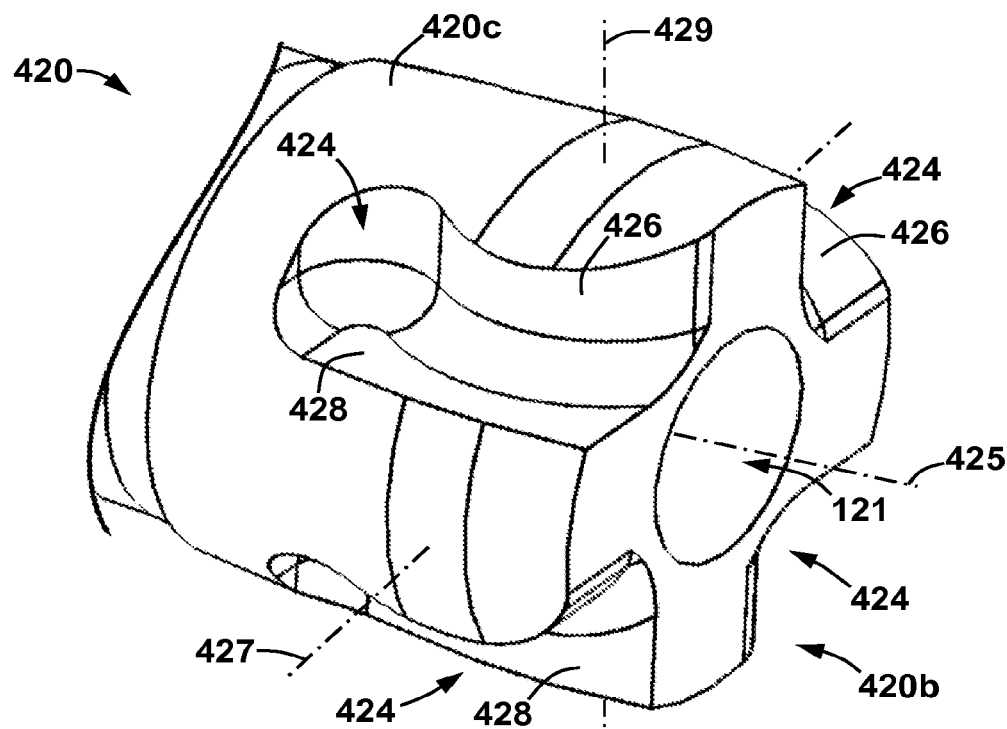
FIG. 18 is a perspective view of a lower end of the driveshaft of FIG. 16.
Figure 19:
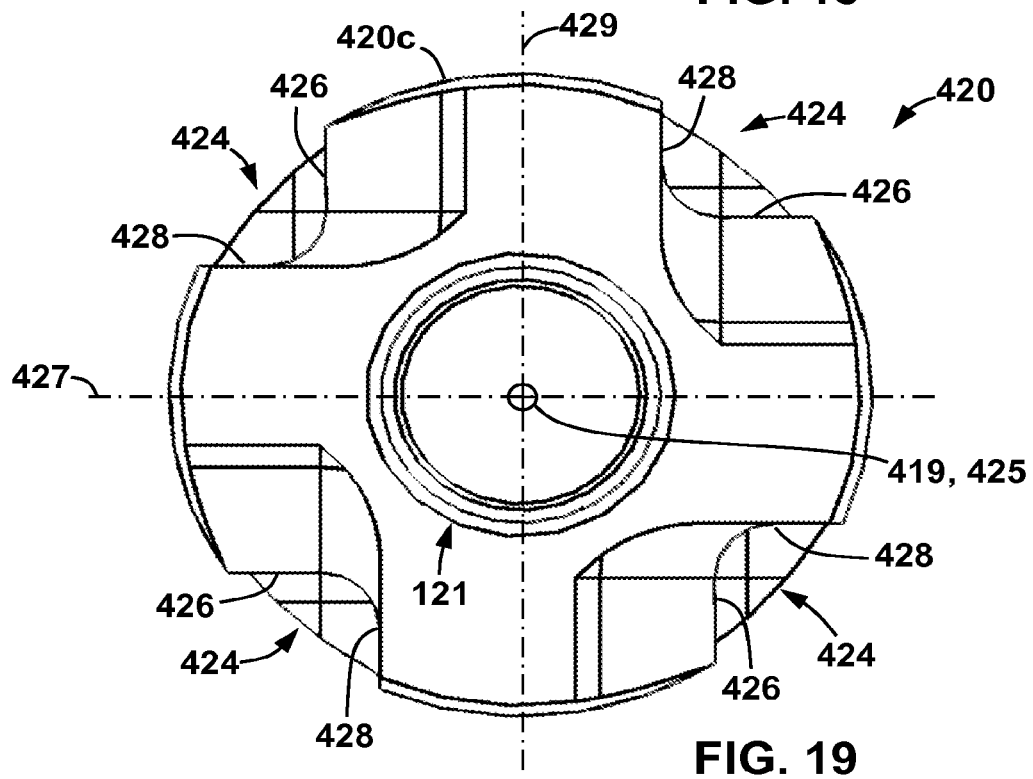
FIG. 19 is a front or axial view of the lower end of driveshaft of FIG. 16.

Referring now to FIGS. 17-19, lower end 420b of driveshaft 420 is shown. In addition to cavity 121 previously described, lower end 420b includes a plurality of recesses 424 extending radially inward from outer surface 420c and extending axially from lower end 420b. Each recess 424 is at least partially defined by a convex cylindrical surface 426, and a second planar surface 428. As will be described in more detail below, during drilling operations, torque is transferred from driveshaft 420 through the surface 426 of each recess 424, and thus, convex cylindrical surface 426 of each recess 424 may be referred to herein as either an engagement or torque transfer surface 426. In addition, lower end 420b of driveshaft 420 includes a first pivot axis 427 and a second pivot axis 429. Axes 427, 429 are referred to herein as "pivot" axes because, as described in more detail below, shaft 420 is free to pivot at lower end 420b about one or both of axes 427, 429 during rotation thereof about central axis 425. Axes 427, 429 are oriented orthogonal to each other and intersect at a center point 419 disposed along axis 425. Thus, axes 425, 427, 429 all intersect at center 419. In addition, axes 427, 429 lie in a plane oriented perpendicular or orthogonal to axis 425. Further, in this embodiment center 419 also corresponds to the center of curvature of concave spherical surface 123 in cavity 121 and the center of thrust ball 122 when ball 122 is installed within cavity 121 as previously described (e.g., see FIG. 17). Thus, sliding engagement between thrust ball 122 and surface 123 of cavity 121 and sliding engagement between ball 122 and surface 182 of bearing insert 180 allows driveshaft 420 to pivot about center 419 during operations.

In this embodiment, lower end 420*b* includes a total of four recesses 424 circumferentially spaced uniformly about axis 425, such that each recess 424 is disposed approximately 90° from each circumferentially adjacent recess 424. As a result, for each recess 424, the surface 426 is concentrically disposed about one of the pivot axes 427, 429 and the surface 428 is perpendicular to one of the pivot axes 427, 429. Thus, each recess 424 is substantially V-shaped when viewed in cross-section along axis 425 (e.g., as shown in FIG. 19). In addition, surfaces 426 of each pair of radially opposed recesses 424 with respect to axis 425 (i.e., recesses that are disposed 180° from one another about axis 425) are each concentrically disposed about the same axis 427 or 429. Moreover, in this embodiment, each of the surfaces 428 are parallel to the central axis 425 of driveshaft 420; however in other embodiments, surfaces 428 are not parallel to axis 425 and are instead disposed at some non-zero angle thereto.

Figure 20:
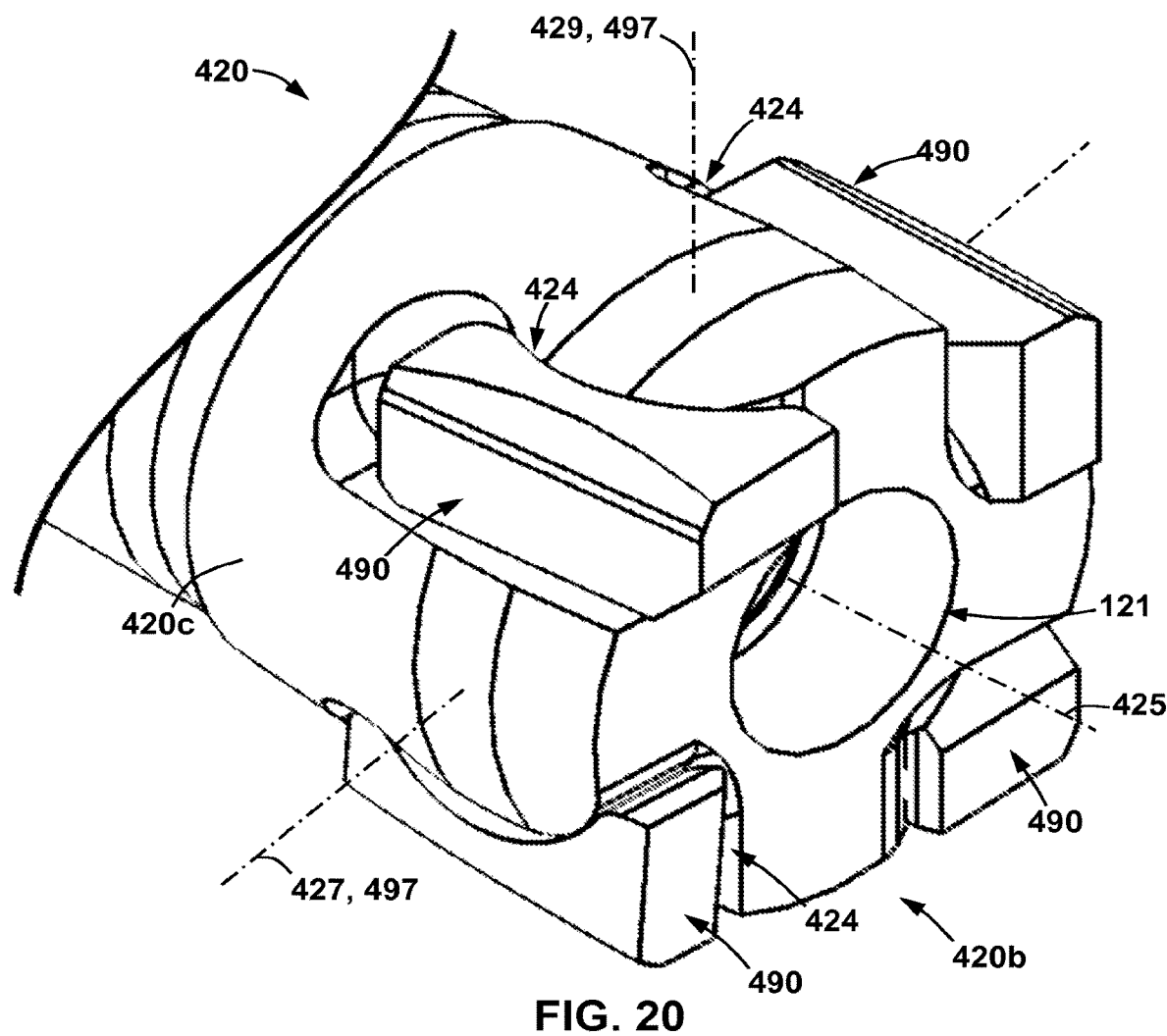
FIG. 20 is another perspective view of the lower end of the driveshaft of FIG. 16 illustrating the installation of torque transfer keys thereon in accordance with the at least some embodiments.

Referring now to FIGS. 17 and 20, a plurality of torque transfer keys 490 is disposed about lower end 420*b* of driveshaft 420 within receptacle 446 to transmit torque loads between driveshaft 420 and end housing 440 as driveshaft 420 rotates about axis 425. As will be described in more detail below, sliding engagement of corresponding mating surfaces of torque transfer keys 490, lower end 420*b*, and receptacle 446 allow driveshaft 420 to transfer torque to end housing 440 through direct, face-to-face engagement even as driveshaft 420 pivots about axes 427, 429 relative to end housing 440 as previously described.

Figure 21:
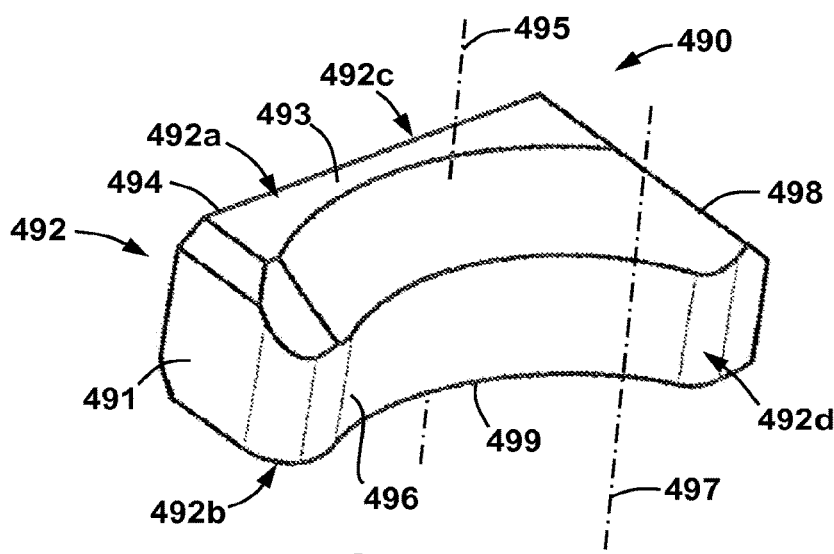
FIG. 21 is a perspective view of one of the torque transfer keys of FIG. 20.
Figure 22:
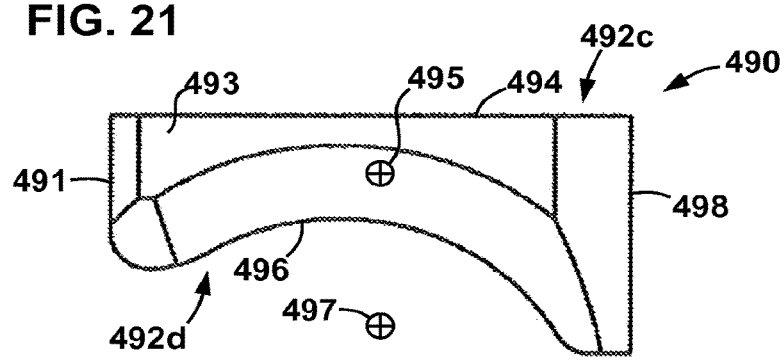
FIG. 22 is a top view of one of the torque transfer keys of FIG. 20.

Referring now to FIGS. 21-23, each of the torque transfer keys 490 is generally C-shaped and comprises a body 492 having a central axis 495, a first or top side 492*a*, a second or bottom side 492*b* axially opposite the top side 492*a*, a first lateral side 492*c*, and a second lateral side 492*d* radially opposite the first lateral side 492*c*. In this embodiment, the axis 495 passes through the center of mass of key 490 and is parallel to one of the axes 427, 429 when driveshaft assembly 400 is fully made up. In addition, in this embodiment, side 492*a* comprises a planar surface 493 that is oriented perpendicular to axis 495 and side 492*b* comprises a convex or outwardly curved surface 499. In addition, in this embodiment, side 492*c* comprises a planar torque transfer surface 494 extending axially between sides 492*a*, 492*b*, and side 492*d* comprises a concave cylindrical torque transfer surface 496 extending axially between sides 492*a*, 492*b*. A pair of parallel planar surfaces 491, 498 extend between each of the planar surface 494 and the concave cylindrical surface 496 and also extend axially between planar sides 492*a*, 492*b*. Surface 496 is concentric about an axis of curvature 497 that is oriented parallel to axis 495 and surface 494, and radially spaced from axis 495 and surface 494. Axes 495, 497 lie in a plane oriented perpendicular to surface 494. Further, as will be described in more detail below, in this embodiment, axis 497 of each key 490 is aligned with one of the pivot axes 427, 429 when key 490 is installed on lower end 420*b* of driveshaft 420. Still further, in this embodiment, the transitions between the surfaces 493, 499 and each of the surfaces 491, 494, 496, 498 are chamfered in order to allow for proper clearances when assembly 400 is fully made up. Also, in this embodiment, planar surface 498 is larger than planar surface 491 such that keys 490 will substantially conform to the shape of recess 424 during operations; however, it should be appreciated that such an arrangement is not required and in other embodiments surface 491, 498 may be the same size or surface 491 may be larger than surface 498.

Referring again to FIGS. 24 and 25, in this embodiment each pocket 602 of receptacle 446 is defined by a first planar surface 610, a second planar surface 612 parallel to the first planar surface 610, a third planar surface 614 extending perpendicularly relative to both the surfaces 610, 612, a fourth planar surface 616 extending between surfaces 612, 614, and a fifth planar surface 617 extending between surface 610, 614. The transitions between each of the surfaces 610, 612, 614, 616 are radiused in order to increase the manufacturing efficiency of housing 440 as well as to ensure proper clearance of interlocking components during operations. Moreover, in this embodiment, each of the surfaces 610, 612, 614, 616 extend axially or parallel to axis 445 of end housing 440. As will be described in more detail below, each of the first planar surfaces 610 of pockets 602 engage with mating surfaces on torque transfer keys 490 in order to transfer torque between shaft 420 and end housing 440 during rotation of driveshaft 420 about axis 425. Thus, surfaces 610 may be referred to herein as either engagement or torque transfer surfaces 310.

Figure 25:
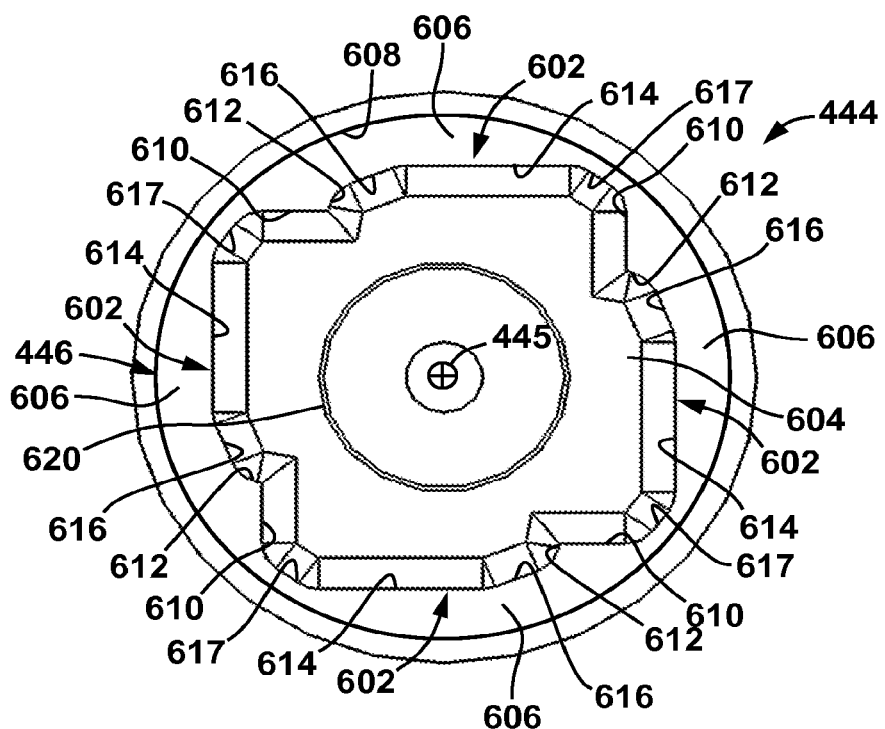
FIG. 25 is a front or axial view of the end housing of the universal joint assembly of FIG. 17.

As is also best shown in FIG. 25, pockets 602 are arranged within receptacle 446 such that the first planar engagement surface 610 of each pocket 602 extends to the second planar surface 612 of the immediately circumferentially adjacent pocket 602. In addition, the first planar engagement surfaces 610 of radially opposing pockets 602 (i.e., pockets 602 that are circumferentially disposed 180° from one another about axis 445) are generally parallel to one another. Such a parallel relationship of surfaces 610 ensures that torque transfer between driveshaft 420 and end housing 440 is more evenly distributed.

Referring now to FIGS. 18, 20, and 21-23, during make up of driveshaft assembly 400, each of the keys 490 is disposed within one of the recesses 424 on lower end 420*b*. In particular, each key 490 is disposed within one of the recesses 424 such that planar surface 493 slidingly engages planar surface 428, and concave cylindrical surface 496 slidingly engages convex cylindrical surface 426. In addition, as is best shown in FIG. 20, when keys 490 are disposed within recesses 424 as described above, the axis of curvature 497 of each surface 496 on each key 490 aligns with and is therefore coincident with one of the pivot axes 427, 429 of driveshaft 420. Thus, during operations, each key 490 is allowed to pivot or rotate about one of the pivot axes 427, 429 through sliding engagement of the surfaces 426, 496 and sliding engagement of surface 493 and surface 428. This arrangement facilitates the pivoting of driveshaft 420 about axes 427, 429 relative to end housing 440. In addition, in this embodiment, either prior or subsequent to installation of torque transfer keys 490 on lower end 420*b*, thrust ball 122 is installed within cavity 121 and is seated on concave spherical bearing surface 123 (e.g., see FIG. 17).

Figure 26:
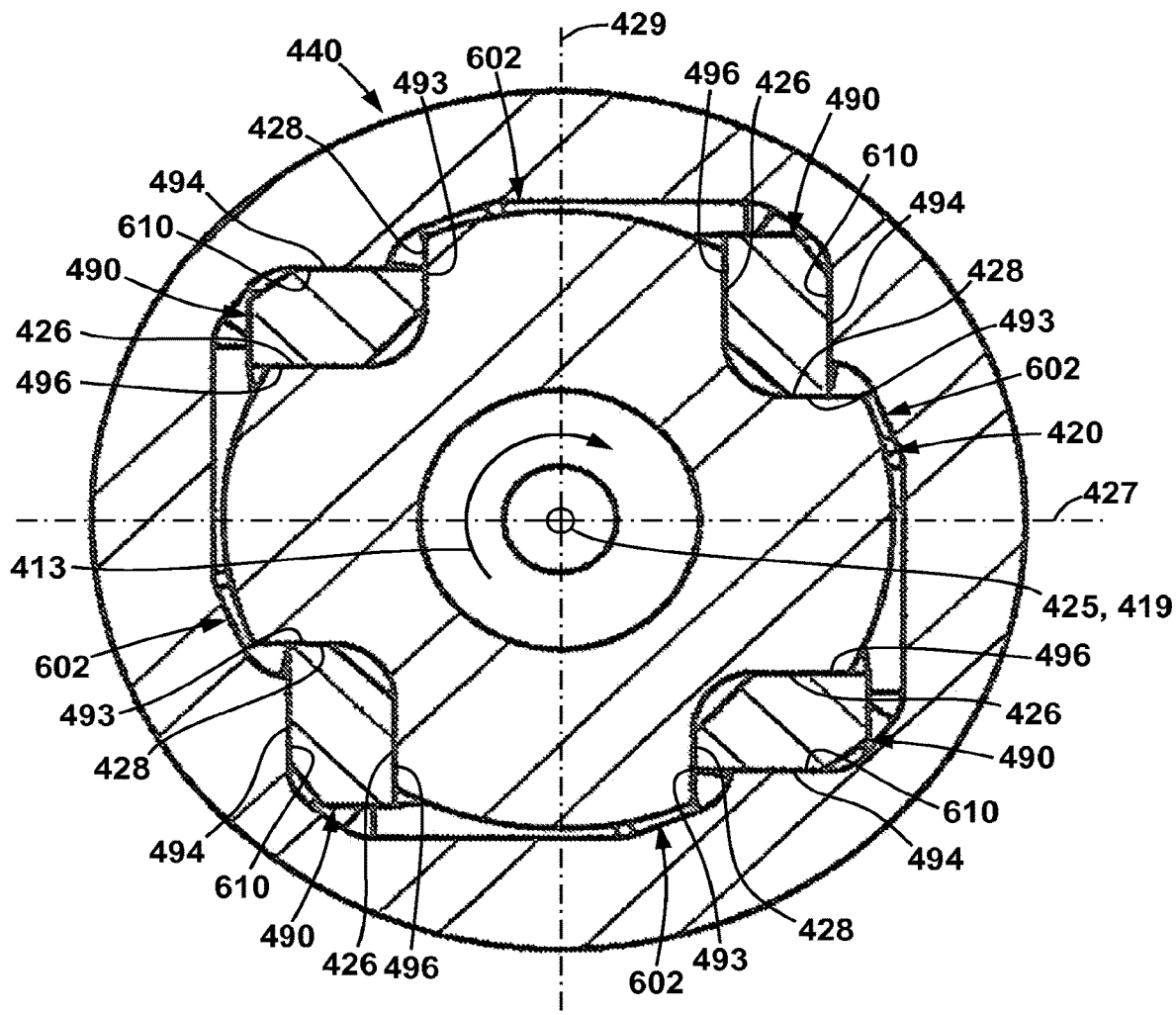
FIG. 26 is a cross-sectional view of the universal joint assembly taken along section XXVI-XXVI in FIG. 17.

Referring now to FIGS. 17 and 26, lower end 420*b* of driveshaft 420, with torque transfer keys 490 installed thereon in the manner described above, is then inserted within receptacle 446 on end housing 440 such that upper end 181*a* of body 181 of bearing insert 180 extends into cavity 121 and concave spherical bearing surface 182 on upper end 181*a* engages thrust ball 122. In this arrangement, thrust ball 122 is disposed between and engaged with concave spherical bearing surfaces 123, 182 as shown in FIG. 17. In addition, as lower end 420*b* of driveshaft 420 and keys 490 are installed within receptacle 446, surfaces 494 on keys 490 slidingly engage with the corresponding engagement surfaces 610 of pockets 602 as shown in FIG. 26.

Referring still to FIGS. 17 and 26, once driveshaft assembly 400 is fully made up, driveshaft 420 is free to pivot relative to lower end housing 440 about center 419, while rotating about axis 425. In particular, as shaft 420 rotates about axis 425 in direction 413, lower end 420b can pivot about one or both of the axes 427, 429 through sliding engagement of thrust ball 122 on surface 123 within cavity 121 and concave spherical bearing surface 182 of insert 180. Additionally, pivoting of end 420b of driveshaft 420 about axes 427, 429 is further accommodated by sliding engagement of cylindrical surface 496 of each key 490 and cylindrical surface 426 of each corresponding recess 424 on lower end 420b of driveshaft 420, as well as sliding engagement of planar surface 493 of each key 490 and planar surface 428 of the corresponding recess 424. It should be appreciated that in some embodiments, keys 490 move relative to pockets 602 during the rotation and pivoting of driveshaft 420 described above, and thus, the planar surface 494 of each key 490 also sliding engages the planar engagement surface 610 of each corresponding pocket 602 during these operations.

Moreover, during rotation of shaft 420 about axis 425 in direction 413, torque is transferred between lower end 420b and end housing 440 through torque transfer keys 490. In particular, torque is first transferred between lower end 420b and keys 490 through engagement of cylindrical surfaces 426, 496. Thereafter, torque is transferred between keys 490 and end housing 440 through engagement of surfaces 494, 610. Because keys 490 are configured to pivot about one of the axes 427, 429 relative to recesses 424 on lower end 420b of driveshaft 420 in the previously described embodiment, keys 490 are able to maintain face-to-face contact between surfaces 496, 426 and surfaces 494, 610 as driveshaft 420 pivots about axes 427, 429 simultaneous with rotation about axis 425 in direction 413. In this embodiment, the coupling between upper end housing 430 and upper end 420a of driveshaft 420 is structurally and functionally the same as the coupling between lower end housing 440 and lower end 420b of driveshaft described above; however, it should be appreciated that such structural symmetry is not required.

In the manner described, through direct engagement of such mating surfaces (e.g., mating surfaces on keys 490, driveshaft 420, and receptacle 446), driveshaft assembly 400 enables the transfer of torque through direct, face-to-face surface contact as opposed to point or line contact. Moreover, for driveshaft assembly 400, face-to-face surface contact is maintained between mating surfaces (e.g., mating surfaces on driveshaft 420, torque transfer keys 490, and end housing 440), even as the driveshaft pivots about orthogonal pivot axes (e.g., pivot axes 427, 429). Torque transfer through such direct, face-to-face contact of surfaces offers the potential to greatly reduce the rate of wear between the interacting surface and thereby increase the running life of the driveshaft assembly 400 and other related components.

While driveshaft assembly 400 has been described herein to include a driveshaft 420 with structurally identical ends 420a, 420b as well as structurally identical socket sections 434, 444, it should be appreciated that other embodiments may not include such structural symmetry. Further, while pockets 602 within receptacle 446 have been described as being defined by surfaces 610, 612, 614, 616, it should be appreciated that the exact size, shape, number, and arrangement of pockets 602 within receptacle 446 may be greatly varied. Thus, embodiments of pockets 602 may assume any suitable shape that presents one or more engagement surfaces for engagement with mating surfaces on torque transfer keys 490. Moreover, the specific shape and arrangement shown for pockets 602 in the Figures is merely illustrative of one potential option for the design of pockets 602, and there is no intent to limit other potential embodiments of pockets 602 to the specific shape shown therein. Similarly, it should also be appreciated that the specific number, shape, arrangement, and surfaces defining recesses 424 on driveshaft 420 may be greatly varied in the same manner, and may assume any suitable shape, arrangement, number, etc., that presents one or more engagement surfaces for engagement with mating surfaces on torque transfer keys 490. Still further, while embodiments of driveshaft 420 disclosed herein have included a spherical thrust ball 122, it should be appreciated that in other embodiments, driveshaft 420 may not include cavity and/or thrust ball 122. For example, in some embodiments, driveshaft 420 includes a convex spherical bearing surface on end 120a and/or end 120b in place of thrust ball 122 and/or cavity 121

While specific embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A driveshaft assembly, comprising:
   a driveshaft including a longitudinal shaft axis, a first end, a second end axially opposite the first end, a radially outer surface extending axially from the first end to the second end, and a plurality of circumferentially-spaced recesses extending radially inward from the radially outer surface at the first end, wherein each recess is at least partially defined by a convex cylindrical surface and a planar surface oriented parallel to the longitudinal axis; and
   a plurality of torque transfer keys, wherein one torque transfer key is configured to be seated in each of the plurality of recesses, wherein each torque transfer key includes a first planar key surface configured to slidingly engage the planar surface of the corresponding recess and a concave cylindrical surface configured to slidingly engage the convex cylindrical surface of the corresponding recess.

2. The driveshaft assembly of claim 1, wherein each convex cylindrical surface is concentrically disposed about a first pivot axis or a second pivot axis, wherein the first pivot axis, the second pivot axis, and the longitudinal axis are orthogonal, and wherein each planar surface is oriented perpendicular to the first pivot axis or the second pivot axis.

3. The driveshaft assembly of claim 2, wherein each torque transfer key is configured to pivot about the first pivot axis or the second pivot axis relative to the driveshaft.

4. The driveshaft assembly of claim 2, wherein the convex cylindrical surface of each torque transfer key has a center of curvature aligned with the first pivot axis or the second pivot axis.

5. The driveshaft assembly of claim 1, wherein each torque transfer key includes a convex surface opposite the first planar key surface.

6. The driveshaft assembly of claim 1, wherein the plurality of recesses comprises four uniformly circumferentially-spaced recesses and the plurality of torque transfer keys comprises four torque transfer keys.

7. The drive shaft assembly of claim 1, further comprising:
a first end housing, wherein the plurality of torque transfer keys are configured to transfer torque between the driveshaft and first end housing.

8. The driveshaft assembly of claim 7, wherein the first end housing includes a longitudinal housing axis and a receptacle extending axially from an end of the first end housing, wherein the receptacle includes a plurality of circumferentially-spaced planar receptacle surfaces;
wherein each torque transfer key includes a second planar key surface opposite the concave cylindrical surface, wherein the second planar key surface of each torque transfer key is configured to slidingly engage one of the planar receptacle surfaces.

9. A driveshaft assembly, comprising:
a driveshaft including a longitudinal shaft axis, a first end, a second end opposite the first end, and a radially outer surface, wherein the first end includes a plurality of recesses extending radially inward from the radially outer surface, the recesses each comprising a convex engagement surface;
a first end housing including a longitudinal housing axis, and an axially extending receptacle, wherein the receptacle includes a plurality of planar receptacle surfaces; and
a plurality of torque transfer keys configured to transfer torque between the driveshaft and first end housing, each of the torque transfer keys including a planar key surface and a concave key surface;
wherein:
the convex engagement surface of each recess engages the concave key surface of one of the torque transfer keys; and
the planar key surface of each torque transfer key engages one of the planar receptacle surfaces;
wherein the plurality of recesses comprises:
a first recess;
a second recess circumferentially spaced 90° from the first recess about the shaft axis;
a third recess circumferentially spaced 90° from the second recess about the shaft axis; and
a fourth recess circumferentially spaced 90° from each of the third recess and the first recess about the shaft axis.

10. The driveshaft assembly of claim 9, wherein the planar receptacle surfaces extend parallel to the housing axis.

11. The driveshaft assembly of claim 10, wherein the concave key surface of each torque transfer key is configured to slidably engage the convex engagement surface of the corresponding recess to accommodate pivoting of the driveshaft about one or more pivot axes extending perpendicular to the shaft axis.

12. The driveshaft assembly of claim 9, wherein the driveshaft is configured to pivot about a first pivot axis and a second pivot axis relative to the first end housing;
wherein the first pivot axis is orthogonal to the second pivot axis;
wherein the first pivot axis and the second pivot axis are each orthogonal to the shaft axis; and
wherein the first pivot axis and the second pivot axis each cross the shaft axis at a center point.

13. The driveshaft assembly of claim 5, wherein plurality of torque transfer keys comprises:
a first torque transfer key disposed within the first recess such that the concave key surface of the first torque transfer key engages with the convex engagement surface of the first recess;
a second torque transfer key disposed within the second recess such that the concave key surface of the second torque transfer key engages with the convex engagement surface of the second recess;
a third torque transfer key disposed within the third recess such that the concave key surface of the third torque transfer key engages with the convex engagement surface of the third recess; and
a fourth torque transfer key disposed within the fourth recess such that the concave key surface of the fourth torque transfer key engages with the convex engagement surface of the fourth recess.

14. The driveshaft assembly of claim 13, wherein the first pivot axis is aligned with:
a center of curvature of the convex engagement surface of the first recess;
a center of curvature of the convex engagement surface of the third recess;
a center of curvature of the concave key surface of the first torque transfer key; and
a center of curvature of the concave key surface of the third torque transfer key.

15. The driveshaft assembly of claim 14, wherein the second pivot axis is aligned with:
a center of curvature of the convex engagement surface of the second recess;
a center of curvature of the convex engagement surface of the fourth recess;
a center of curvature of the concave key surface of the second torque transfer key; and
a center of curvature of the concave key surface of the fourth torque transfer key.

* * * * *